United States Patent
Negugogor et al.

(10) Patent No.: US 12,420,488 B2
(45) Date of Patent: Sep. 23, 2025

(54) SYSTEMS AND METHODS FOR CONTROLLING ADDITIVE MANUFACTURING

(71) Applicant: Continuous Composites Inc., Coeur d'Alene, ID (US)

(72) Inventors: Mikel Negugogor, Logan, UT (US); Logan Lalonde, Post Falls, ID (US); Rachael Kathleen Morris, Greenacres, WA (US)

(73) Assignee: Continuous Composites Inc., Coeur d'Alene, ID (US)

( * ) Notice: Subject to any disclaimer, the term of this patent is extended or adjusted under 35 U.S.C. 154(b) by 758 days.

(21) Appl. No.: 17/652,223

(22) Filed: Feb. 23, 2022

(65) Prior Publication Data

US 2022/0266527 A1   Aug. 25, 2022

Related U.S. Application Data

(60) Provisional application No. 63/200,250, filed on Feb. 24, 2021.

(51) Int. Cl.
*B29C 64/393* (2017.01)
*B29C 64/209* (2017.01)
*B29C 64/245* (2017.01)
*B33Y 10/00* (2015.01)
*B33Y 30/00* (2015.01)
*B33Y 50/02* (2015.01)
(Continued)

(52) U.S. Cl.
CPC .......... *B29C 64/393* (2017.08); *B29C 64/209* (2017.08); *B29C 64/245* (2017.08); *B33Y 30/00* (2014.12); *B33Y 50/02* (2014.12); *B33Y 10/00* (2014.12); *G06F 30/17* (2020.01); *G06F 2113/10* (2020.01)

(58) Field of Classification Search
None
See application file for complete search history.

(56) References Cited

U.S. PATENT DOCUMENTS 5,354,414 A   10/1994   Feygin
9,511,543 B2  12/2016   Tyler
(Continued)

FOREIGN PATENT DOCUMENTS

EP   3345742 A1   7/2018

OTHER PUBLICATIONS

International Search Report for PCT/US2017/047493 (filed on Aug. 18, 2017) mailed Dec. 27, 2017.
(Continued)

*Primary Examiner* — Sean Shechtman
(74) *Attorney, Agent, or Firm* — Ryan Stockett

(57) ABSTRACT

Methods and associated systems and apparatus are disclosed for determining a tool path for use in additively manufacturing a structure. The methods may include identifying a propagation surface onto which material forming at least part of the structure is to be deposited, and determining a structure boundary associated with the propagation surface and defining at least part of the structure. The methods may also include determining one or more structure layers offset from the propagation surface and laterally bounded by the structure boundary; generating a tool path for each structure layer.

13 Claims, 21 Drawing Sheets

(51) Int. Cl.
*G06F 30/17* (2020.01)
*G06F 113/10* (2020.01)

(56) References Cited

U.S. PATENT DOCUMENTS

| | | |
|---|---|---|
| 11,254,060 B2 | 2/2022 | Woytowitz |
| 2014/0170012 A1 | 6/2014 | Delisle et al. |
| 2014/0291886 A1 | 10/2014 | Mark et al. |
| 2015/0005919 A1 | 1/2015 | McGatha et al. |
| 2015/0321419 A1 | 11/2015 | Linthicum et al. |
| 2018/0065304 A1 | 3/2018 | Stockett et al. |
| 2018/0065305 A1 | 3/2018 | Tyler |
| 2018/0065306 A1 | 3/2018 | Tyler et al. |
| 2018/0065307 A1 | 3/2018 | Stockett et al. |
| 2018/0065308 A1 | 3/2018 | Stockett et al. |
| 2018/0065309 A1 | 3/2018 | Tyler et al. |
| 2018/0067464 A1 | 3/2018 | Budge et al. |
| 2019/0344511 A1* | 11/2019 | Hsieh .................... B29C 64/393 |
| 2020/0159186 A1* | 5/2020 | King .................... B33Y 50/00 |
| 2020/0207024 A1 | 7/2020 | Morris et al. |
| 2020/0238627 A1 | 7/2020 | Morris et al. |
| 2021/0072715 A1 | 3/2021 | Stockett et al. |
| 2021/0394432 A1 | 12/2021 | Lalonde et al. |
| 2021/0394451 A1 | 12/2021 | Lalonde et al. |
| 2021/0394452 A1 | 12/2021 | Lalonde et al. |
| 2021/0394453 A1 | 12/2021 | Lalonde et al. |
| 2022/0266342 A1* | 8/2022 | King .................... B33Y 50/02 |
| 2023/0202115 A1* | 6/2023 | Embery .................... C23C 4/12 |
| | | 700/119 |

OTHER PUBLICATIONS

International Search Report PCT/US2021/070725 (filed Jun. 17, 2021) mailed Oct. 7, 2021.
Zhao Gang et al: "Nonplanar slicing and Path Generation Methods for Robotic Additive Manufacturing", The International Journal of Advanced Manufacturing Technology, Springer, London, vol. 96, No. 9, Mar. 1, 2018, pp. 3149-3159, XP036509304, ISSN: 0268-3768, DOI: 10.1007/S00170-018-1772-9 (retrieved on Mar. 1, 2018) abstract p. 3149-3159.

* cited by examiner

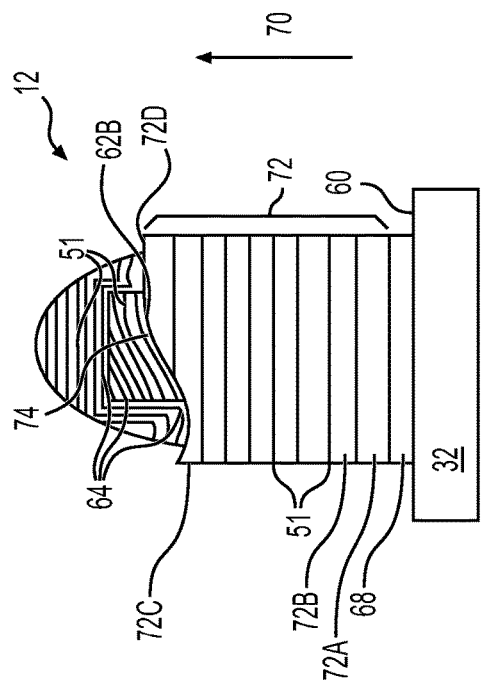
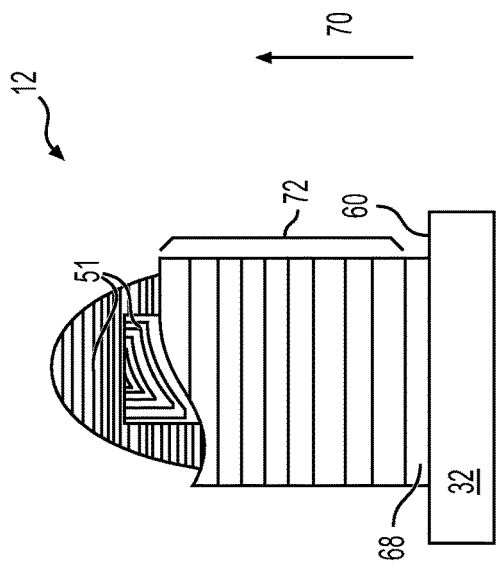
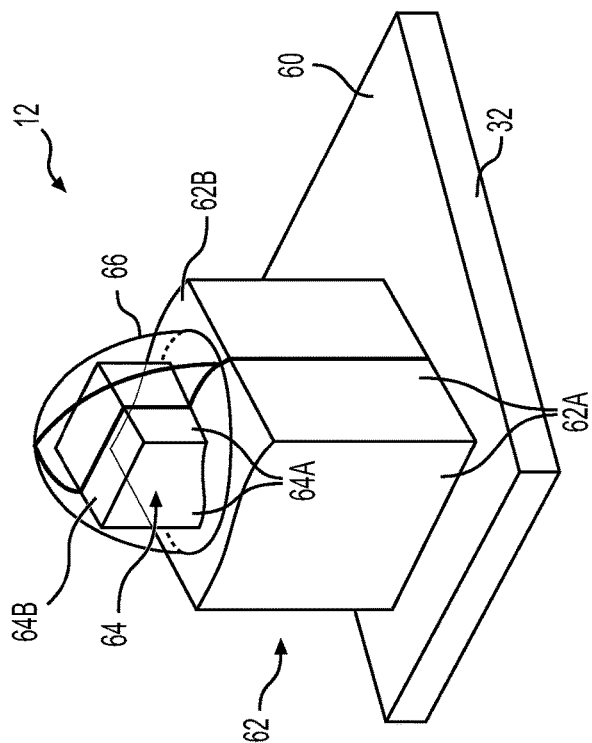

SYSTEMS AND METHODS FOR CONTROLLING ADDITIVE MANUFACTURING

RELATED APPLICATION

This application is based on and claims the benefit of priority from U.S. Provisional Application No. 63/200,250 that was filed on Feb. 24, 2021, the contents of which are expressly incorporated herein by reference.

TECHNICAL FIELD

The present disclosure relates generally to manufacturing control systems and, more particularly, to systems and methods for controlling additive manufacturing.

BACKGROUND

Additive manufacturing is a process of creating three-dimensional parts by depositing overlapping layers of material under the guided control of a computer. A common form of additive manufacturing is known as fused deposition modeling (FDM). Using FDM, a thermoplastic is passed into and liquified within a heated print head. The print head is moved in a predefined trajectory (a.k.a., a tool path) as the material discharges from the print head, such that the material is laid down in a particular pattern and shape of overlapping 2-dimensional layers. The material cools after exiting the print head and hardens into a final form. A strength of the final form is primarily due to properties of the thermoplastic supplied to the print head and a 3-dimensional shape formed by the stack of 2-dimensional layers.

A recently developed improvement over FDM manufacturing involves the use of continuous reinforcements, which in some examples include fibers embedded within material discharging from the print head. For example, a matrix is supplied to the print head and discharged (e.g., extruded and/or pultruded) along with one or more continuous fibers also passing through the same head at the same time. The matrix can be a traditional thermoplastic, a powdered metal, a liquid matrix (e.g., a snap-curing and/or two-part resin), or a combination of any of these and other known matrixes. Upon exiting the print head, a cure enhancer (e.g., a UV light, a laser, an ultrasonic emitter, a heat source, a catalyst supply, etc.) is activated to initiate and/or complete curing (e.g., hardening, cross-linking, polymerization, sintering, etc.) of the matrix. This curing occurs almost immediately, allowing for unsupported structures to be fabricated in free space. And when fibers, particularly continuous fibers, are embedded within the structure, a strength of the structure may be multiplied beyond the matrix-dependent strength. An example of this technology is disclosed in U.S. Pat. No. 9,511,543 that issued to Tyler on Dec. 6, 2016 ("the '543 patent").

The disclosed systems and methods are directed to addressing ways of controlling additive manufacturing systems similar to those disclosed in the '543 patent and/or other systems known in the art.

SUMMARY

According to an aspect, there is provided a method of determining a tool path for use in additively manufacturing a structure. The method may include identifying a propagation surface onto which material forming at least part of the structure is to be deposited and determining a structure boundary associated with the propagation surface and defining at least part of the structure. The method may also include determining one or more structure layers offset from the propagation surface and laterally bounded by the structure boundary; generating a tool path for each structure layer.

According to an aspect, there is provided a computer program product comprising computer program code that, when executed on a computer processor, is configured to perform a method. The method may include identifying a propagation surface onto which material forming at least part of the structure is to be deposited and determining a structure boundary associated with the propagation surface and defining at least part of the structure. The method may also include determining one or more structure layers offset from the propagation surface and laterally bounded by the structure boundary and generating a tool path for each structure layer.

According to an aspect, there is provided an additive manufacture system, comprising a moveable support, a print head connected to the moveable support and configured to discharge a material, and a computer processor. The computer processor may include computer program code that, when executed on the computer processor, is configured to a method. The method may include identifying a propagation surface onto which material forming at least part of the structure is to be deposited and determining a structure boundary associated with the propagation surface and defining at least part of the structure. The method may also include determining one or more structure layers offset from the propagation surface and laterally bounded by the structure boundary and generating a tool path for each structure layer.

BRIEF DESCRIPTION OF THE DRAWINGS

FIGS. 14-16 are schematic illustrations of arrangements for propagating layers of a structure to be fabricated by the machine of FIG. 1;

DETAILED DESCRIPTION

Figure 1:
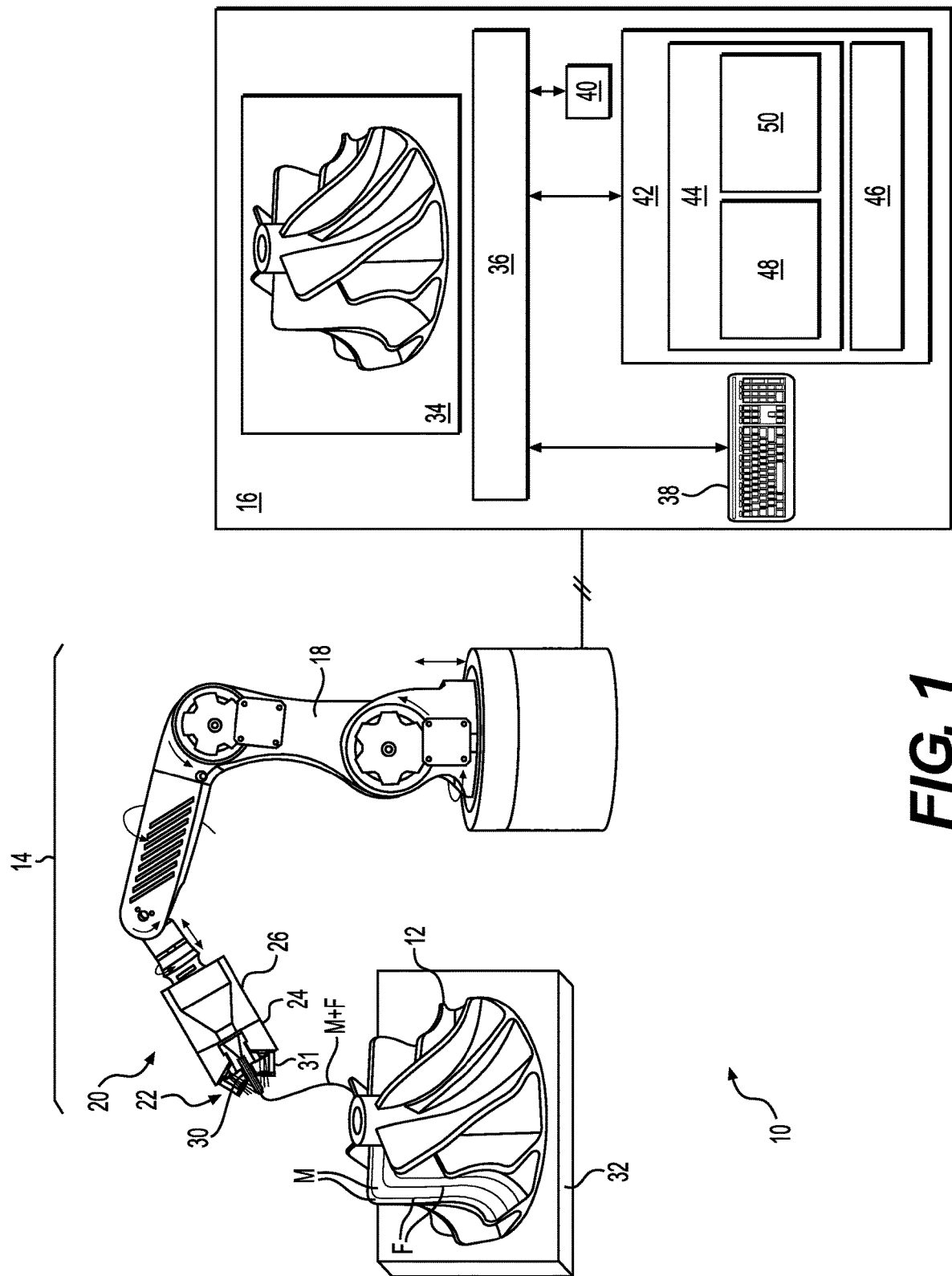
FIG. 1 is a diagrammatic illustration of an exemplary disclosed additive manufacturing machine and a corresponding system that may be used to control the machine.

FIG. 1 illustrates an exemplary control system ("system") 10, which may be used to design, plan, fabricate, and/or analyze a structure 12 having any desired shape, size, consist, and functionality. System 10 may include, among other things, an additive manufacturing machine ("machine") 14 and at least one computing device 16 operatively connected to machine 14. Machine 14 may be configured to create structure 12 under the guided control of computing device 16, for example by way of an additive manufacturing process. Although additive manufacturing processes utilizing one or more continuous reinforcements (e.g., fibers—F) and one or more curable matrixes (M) will be described below as examples of how structure 12 may be created, it should be noted that other processes known in the art could alternatively be utilized for this purpose and benefit from the disclosed control systems and methods.

Machine 14 may be comprised of components that are controllable to create structure 12, layer-by-layer and/or in free space (e.g., without the bracing of an underlying layer). These components may include, among other things, a support 18 and any number of heads 20 coupled to and/or powered by support 18. In the disclosed embodiment of FIG. 1, support 18 is a robotic arm capable of moving head 20 in multiple directions during fabrication of structure 12. It should be noted that any other type of support (e.g., a gantry, an arm/gantry combination, etc.) capable of moving head 20 in the same or in a different manner could also be utilized, if desired.

Each head 20 (only one shown in FIG. 1, for clarity) may be configured to discharge at least a matrix (e.g., a liquid resin, such as a zero volatile organic compound resin; a powdered metal; etc.) that is curable. Exemplary curable matrixes include a thermoset polymer, single- or multi-part epoxy resins, polyester resins, cationic epoxies, acrylated epoxies, urethanes, esters, a thermoplastic polymer, photopolymers, polyepoxides, thiols, alkenes, thiol-enes, and more. In one embodiment, the matrix inside each head 20 may be pressurized, for example by an external device (e.g., an extruder or another type of pump—not shown) that is fluidly connected to head 20 via a corresponding conduit (not shown). In another embodiment, however, the pressure may be generated completely inside of head 20 by a similar type of device. In yet other embodiments, the matrix may be gravity-fed through and/or mixed within head 20. In some instances, the matrix inside head 20 may need to be kept cool and/or dark to inhibit premature curing; while in other instances, the matrix may need to be kept warm for the same reason. In either situation, head 20 may be specially configured (e.g., insulated, temperature-controlled, shielded, etc.) to provide for these needs.

In some embodiments, the matrix may be mixed with, contain, or otherwise at least partially wet or coat one or more reinforcements (e.g., powders, particles, chopped fibers, unchopped fibers, tows, braids, rovings, fabrics, knits, mats, socks, sheets, tubes, etc.) and, together with the reinforcements, make up at least a portion (e.g., a wall, a surface, internal fill, etc.) of structure 12. The reinforcements may be stored within (e.g., on one or more separate internal spools—not shown) or otherwise passed through head 20 (e.g., fed from one or more external spools). When multiple reinforcements are simultaneously used, the reinforcements may be of the same material and have the same sizing and cross-sectional dimension and shape, or a different material with different sizing and/or cross-sectional dimension and shape. The sizing may include, for example, treatment of the reinforcement with plasma, treatment with an acid (e.g., nitric acid), or otherwise surface-functionalized with an agent (e.g., a dialdehyde, an epoxy, a vinyl, and/or another functional group) to enhance adhesion of the matrix to the reinforcement. The reinforcements may include, for example, carbon fibers, vegetable fibers, wood fibers, mineral fibers, glass fibers, metallic wires, optical tubes, etc. It should be noted that the term "fiber" is meant to encompass both structural and non-structural (e.g., functional) types of continuous reinforcements that can be at least partially encased in the matrix discharging from head 20.

For the purposes of this disclosure, continuous reinforcements may be considered to have an aspect ratio (V) defined as a length (L) divided by a diameter (d) (e.g., V=L/d) that is greater than 10, 100, 1000, 100,000, 1,000,000 or even larger. Discontinuous reinforcements may include reinforcements having an aspect ratio less than that of continuous reinforcements.

The reinforcements may be exposed to (e.g., at least partially coated and/or internally wetted with) the matrix while the reinforcements are inside head 20, while the reinforcements are passing into head 20, and/or while the reinforcements are discharging from head 20. The matrix, dry (e.g., unimpregnated) reinforcements, and/or reinforcements that are already exposed to the matrix (pre-impregnated reinforcements) may be transported into head 20 in any manner apparent to one skilled in the art. In some embodiments, discontinuous may be mixed with the matrix and/or additives before and/or after the matrix coats continuous reinforcements.

Support 18 may move head 20 in a particular trajectory (e.g., a trajectory corresponding to an intended shape, size, and/or function of structure 12) at the same time that the matrix-wetted reinforcement(s) discharge from head 20, such that one or more continuous paths of matrix-wetted reinforcement(s) are formed along the trajectory. Each path may have any cross-sectional shape, diameter, and/or fiber-to-matrix ratio, and the reinforcements may be radially dispersed with the matrix, located at a general center thereof, or located only at a periphery.

One or more cure enhancers (e.g., a light source, a radiation source, an ultrasonic emitter, a microwave generator, a magnetic field generator, a temperature regulator, a catalyst dispenser, a fan, etc.) 22 may be mounted proximate (e.g., within, on, and/or adjacent) head 20 and configured to affect (e.g., initiate, enhance, complete, or otherwise facilitate) curing of the matrix as it is discharged with the reinforcement(s) from head 20. Each cure enhancer 22 may be independently and/or cooperatively controlled to selectively expose one or more portions of the discharging material to cure energy (e.g., electromagnetic radiation, vibrations, positive or negative thermal energy, a chemical catalyst, a pressurized medium, etc.). The energy may trigger a reaction to occur within the matrix, increase a rate of the reaction, sinter the matrix, pyrolyze the matrix, harden the matrix, stiffen the matrix, or otherwise cause the matrix to partially or fully cure as it discharges from head 20. The amount of energy produced by cure enhancer 22 may be sufficient to at least partially cure the matrix before structure 12 axially grows more than a predetermined length away from head 20. In one embodiment, structure 12 is cured sufficient to hold its shape before the axial growth length becomes equal to an external dimension of the matrix-coated reinforcement.

In the embodiment of FIG. 1, head 20 is modular. For example, head 20 may include a matrix reservoir 26 and an outlet 24 that is removably connected to matrix reservoir 26 (e.g., via one or more threaded fasteners, clasps, actuators, and/or other hardware—not shown). In this example, outlet 24 is a single-track outlet configured to discharge composite material having a generally circular, rectangular, triangular, and/or other polygonal cross-section. The configuration of head 20, however, may allow outlet 24 to be swapped out for another outlet that discharges composite material having a different shape (e.g., a tubular cross-section, a ribbon or sheet cross-section, etc.) and/or a different number of tracks.

In some embodiments, cure enhancer(s) 22 may be mounted to or adjacent a lower portion of outlet 24. With this configuration, cure enhancer(s) 22 may be located around a distal end in a configuration that best suits the shape, size, and/or type of material discharging from outlet 24. In the disclosed embodiment, cure enhancer(s) 22 are mounted at an angle relative to a central axis of outlet 24, such that energy from cure enhancer(s) 22 is directed toward the material discharging from outlet 24. One or more optics 31 may be used in some applications, to selectively block, disperse, focus, and/or aim the energy from cure enhancers 22 toward a discharge location of outlet 24. This may affect a cure rate of and/or cure location on the material discharging from outlet 24. It is contemplated that optics 31 may be adjustable, if desired (e.g., manually adjustable via a set screw—not shown, or automatically adjustable via an actuator—not shown).

The matrix and/or reinforcement may be discharged together from head 20 via any number of different modes of operation. In a first example mode of operation, the matrix and/or reinforcement are extruded (e.g., pushed under pressure and/or mechanical force) from head 20 as head 20 is moved by support 18 to create features of structure 12. In a second example mode of operation, at least the reinforcement is pulled from head 20, such that a tensile stress or drag force is created in the reinforcement during discharge. In this second mode of operation, the matrix may cling to the reinforcement and thereby also be pulled from head 20 along with the reinforcement, and/or the matrix may be discharged from head 20 under pressure along with the pulled reinforcement. In the second mode of operation, where the reinforcement is being pulled from head 20, the resulting tension in the reinforcement may increase a strength of structure 12 (e.g., by aligning the reinforcements, inhibiting buckling, equally loading the reinforcements, etc.) after curing of the matrix, while also allowing for a greater length of unsupported structure 12 to have a straighter trajectory. That is, the tension in the reinforcement remaining after curing of the matrix may act against the force of gravity (e.g., directly and/or indirectly by creating moments that oppose gravity) to provide support for structure 12.

The reinforcement may be pulled from head 20 as a result of head 20 being moved and/or tilted by support 18 away from an anchor point (e.g., a print bed, an existing surface of structure 12, a fixture, etc.) 32. For example, at the start of structure formation, a length of matrix-impregnated reinforcement may be pulled and/or pushed from head 20, deposited against anchor point 32, and at least partially cured, such that the discharged material adheres (or is otherwise coupled) to the anchor point 32. Thereafter, head 20 may be moved and/or tilted away from anchor point 32, and the relative motion may cause the reinforcement to be pulled from head 20. As will be explained in more detail below, the movement of reinforcement through head 20 may be selectively assisted via one or more internal feed mechanisms, if desired. However, the discharge rate of reinforcement from head 20 may primarily be the result of relative movement between head 20 and anchor point 32, such that tension is created within the reinforcement. As discussed above, anchor point 32 could be moved away from head 20 instead of or in addition to head 20 being moved away from anchor point 32.

Any number of separate computing devices 16 may be used to design and/or control the placement of fibers within structure 12 and/or to analyze performance characteristics of structure 12 before, during, and/or after formation. Computing device 16 may include, among other things, a display 34, one or more processors 36, any number of input/output ("I/O") devices 38, any number of peripherals 40, and one or more memories 42 for storing programs 44 and data 46. Programs 44 may include, for example, any number of design, pathing, and/or printing apps 48 and an operating system 50.

Display 34 of computing device 16 may include a liquid crystal display (LCD), a light emitting diode (LED) screen, an organic light emitting diode (OLED) screen, and/or another known display device. Display 34 may be used for presentation of data under the control of processor 36.

Processor 36 may be a single or multi-core processor configured with virtual processing technologies and use logic to simultaneously execute and control any number of operations. Processor 36 may be configured to implement virtual machine or other known technologies to execute, control, run, manipulate, and store any number of software modules, applications, programs, etc. In addition, in some embodiments, processor 36 may include one or more specialized hardware, software, and/or firmware modules (not shown) specially configured with particular circuitry, instructions, algorithms, and/or data to perform functions of the disclosed methods. It is appreciated that other types of processor arrangements could be implemented that provide for the capabilities disclosed herein.

Memory 42 can be a volatile or non-volatile, magnetic, semiconductor, tape, optical, removable, non-removable, or other type of storage device or tangible and/or non-transitory computer-readable medium that stores one or more executable programs 44, such as design, analysis, pathing, monitoring and/or printing apps 48 and operating system 50. Common forms of non-transitory media include, for example, a flash drive, a flexible disk, a hard disk, a solid-state drive, magnetic tape or other magnetic data storage medium, a CD-ROM or other optical data storage medium, any physical medium with patterns of holes, a RAM, a PROM, an EPROM, a FLASH-EPROM or other flash memory, NVRAM, a cache, a register or other memory chip or cartridge, and networked versions of the same.

Memory 42 may store instructions that enable processor 36 to execute one or more applications, such as design, pathing, and/or fabrication apps 48, operating system 50, and any other type of application or software known to be available on computer systems. Alternatively or additionally, the instructions, application programs, etc. can be stored in an internal and/or external database (e.g., a cloud storage system—not shown) that is in direct communication with computing device 16, such as one or more databases or memories accessible via one or more networks (not shown). Memory 42 can include one or more memory devices that store data and instructions used to perform one or more features of the disclosed embodiments. Memory 42 can also include any combination of one or more databases controlled by memory controller devices (e.g., servers, etc.) or software, such as document management systems, Microsoft SQL® databases, SharePoint® databases, Oracle® databases, Sybase® databases, or other relational databases.

In some embodiments, computing device 16 is communicatively connected to one or more remote memory devices (e.g., remote databases—not shown) through a network (not shown). The remote memory devices can be configured to store information that computing device 16 can access and/or manage. By way of example, the remote memory devices could be document management systems, Microsoft SQL® database, SharePoint® databases, Oracle® databases, Sybase® databases, Cassandra®, HBase®, or other relational or non-relational databases or regular files. Systems and methods consistent with disclosed embodiments, however, are not limited to separate databases or even to the use of a database.

Programs 44 may include one or more software or firmware modules causing processor 36 to perform one or more functions of the disclosed embodiments. Moreover, processor 36 can execute one or more programs located remotely from computing device 16. For example, computing device 16 can access one or more remote programs that, when executed, perform functions related to disclosed embodiments. In some embodiments, programs 44 stored in memory 42 and executed by processor 36 can include one or more of design, pathing, fabrication, monitoring, and/or analysis apps 48 and operating system 50. Apps 48 may cause processor 36 to perform one or more functions of the disclosed methods. Accordingly, embodiments may be embodied in hardware and/or in software (including firmware, resident software, micro-code, etc.) that runs on a processor, which may collectively be referred to as "circuitry," "a module" or variants thereof.

Operating system 50 may perform known operating system functions when executed by one or more processors, such as processor 36. By way of example, operating system 50 may include Microsoft Windows®, Unix®, Linux©, OSX®, and IOS® operating systems, Android® operating systems, or another type of operating system 50. Accordingly, disclosed embodiments can operate and function with computer systems running any type of operating system 50.

Various methods and apparatus are described herein with reference to block diagrams or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks.

It should also be noted that in some implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated I/O devices 38 may include one or more interfaces for receiving signals, instructions, and/or other input from a user and/or machine 14, and for providing signals, instructions and/or output to machine 14 that cause structure 12 to be printed. Computing device 16 can include, for example, components for interfacing with one or more input devices, such as one or more keyboards, mouse devices, and the like.

Figure 2:
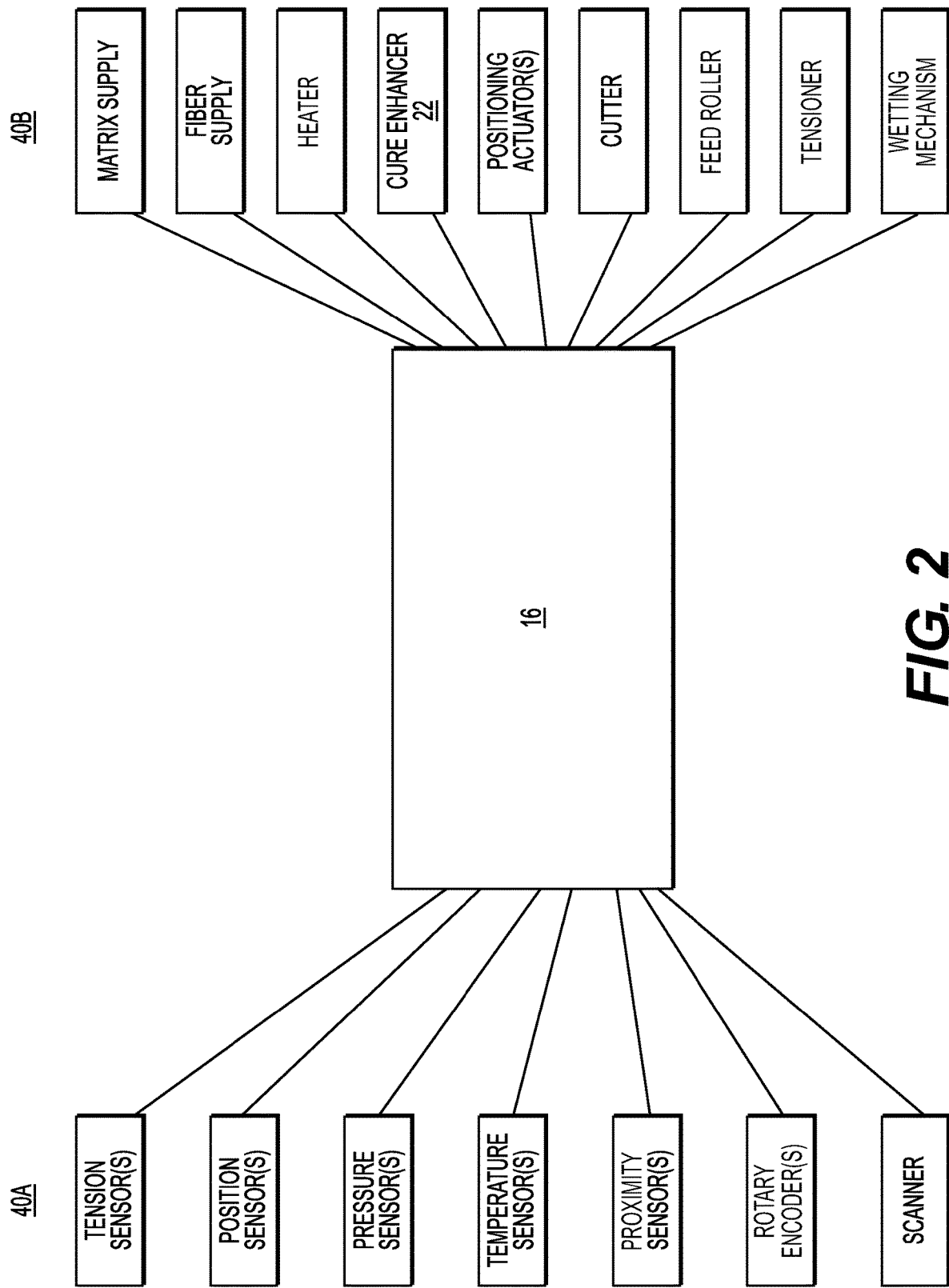
FIG. 2 is a schematic illustration of the control system of FIG. 1.

Peripheral device(s) 40 may be standalone devices or devices that are embedded within or otherwise associated with machine 14 and used during fabrication of structure 12. As shown in FIG. 2, peripherals 40 can embody input devices (e.g., one or more sensors, such as tension sensors, position sensors, pressure sensors, temperature sensors, proximity sensors, rotary encoders, scanners, and other sensors known in the art) 40A and/or output devices (e.g., one or more actuators, such as a matrix supply, a fiber supply, a heater, a pump, cure enhancer 22, a positioning motor, a cutter, a feed roller, a tensioner, a wetting mechanism, a compactor, etc.) 40B. In some embodiments, peripherals 40 may, themselves, include one or more processors (e.g., a programmable logic control (PLC), a computer numeric controller (CNC), etc.), a memory, and/or a transceiver. When peripheral device(s) 40 are equipped with a dedicated processor and memory, the dedicated processor may be configured to execute instructions stored on the memory to receive commands from processor 36 associated with video, audio, other sensory data, control data, location data, etc., including capture commands, processing commands, motion commands, and/or transmission commands. The transceiver may include a wired or wireless communication device capable of transmitting data to or from one or more other components in system 10. In some embodiments, the transceiver can receive data from processor 36, including instructions for sensor and/or actuator activation and for the transmission of data via the transceiver. In response to the received instructions, the transceiver can packetize and transmit data between processor 36 and the other components.

Design, pathing, fabrication, monitoring and/or analysis apps 48 may comprise computer executable instructions for performing all or part of the disclosed methods. Such methods may relate to generating, receiving, processing, analyzing, storing, and/or transmitting data in association with operation of machine 14 and corresponding design/pathing/fabrication/monitoring/analysis of structure 12. For example, apps 48 may comprise computer executable instructions for performing operations including one or more of: displaying a graphical user interface (GUI) on a display (e.g., display 34) for receiving design/control instructions and information from a user; capturing sensory data associated with machine 14 (e.g., via peripherals 40A); receiving instructions (e.g., via I/O devices 38 and/or the user interface) regarding specifications, desired characteristics, and/or desired performance of structure 12; processing the control instructions; generating one or more possible designs of and/or plans for fabricating structure 12; analyzing and/or optimizing the designs and/or plans; providing recommendations of one or more designs and/or plans; compiling and storing machine code including instructions for controlling machine 14 to fabricate a recommended and/or selected design via a recommended and/or selected plan; controlling machine 14 to fabricate a recommended and/or selected design via a recommended and/or selected plan; analyzing the fabrication; and/or providing feedback and adjustments to machine 14 for improving future fabrications. In exemplary arrangements, the design, pathing, fabrication, monitoring and/or analysis apps 48 may be executed, in whole or in part, by processor 36 of machine 14. In other exemplary arrangements, the design, pathing, fabrication, monitoring and/or analysis apps 48 may be executed, in whole or in part, by a processor of a separate computing device remote from computing device 16. In the latter arrangements, the separate computing device may store the compiled machine code for later transfer to machine 14.

INDUSTRIAL APPLICABILITY

The disclosed systems and methods may be used to manufacture composite structures having any desired cross-sectional shape, length, density, stiffness, strength, and/or other characteristic. The composite structures may be fabricated from any number of different reinforcements of the same or different types, diameters, shapes, configurations, and consists, and/or any number of different matrixes. Operation of system 10 will now be described in detail, with reference to the enclosed drawings.

It has been found that a continuity of material discharge by machine 14 can affect a time required to fabricate structure 12 and/or a property of structure 12. For example, the longer a path is continuously discharged, without having to slow or stop to sever the discharging material and restart discharging, the quicker structure 12 can be fabricated. Likewise, greater continuity may result in enhanced strength, stiffness, weight and/or other properties. FIGS. 3-6B illustrate a method employed by computing device 16 that provides for fabrication of structure 12 with greater continuity. In addition, the methods described in relation to FIGS. 3-6B allow for tool paths to be generated that place reinforcements in advantageous locations and orientations. This advantageous placement may enhance a desired property of structure 12. For example, material may be located to accommodate a load that structure 12 is required to withstand.

Figure 3:
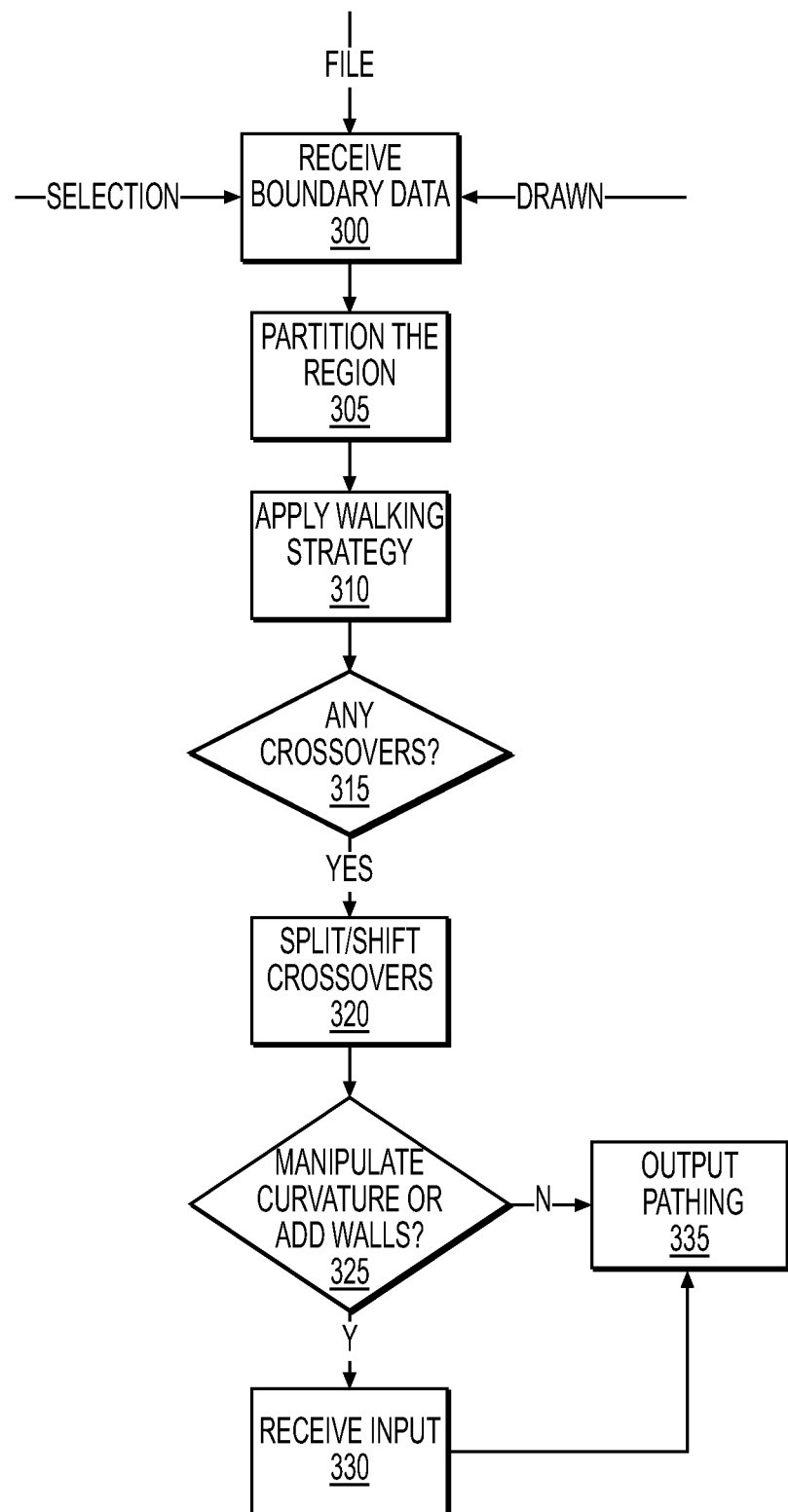
FIG. 3 is a flowchart representing an exemplary method that may be implemented by the control system of FIGS. 1 and 2.

As can be seen in the flowchart of FIG. 3, the first step may include receiving of boundary data (Step 300), which in exemplary arrangements may include polygonal boundary data and/or spline data. The boundary data may be a two-dimensional outer boundary 100 of at least part of structure 12 at a particular height in a Z-direction. Outer boundary 100 may at least partially enclose a region 102 of structure 12. Outer boundary 100 may be received as data by computing device 16 (e.g., by processor 36) via a file (e.g., a CAD drawing), may be drawn by a user of computing device 16 (e.g., via I/O device(s) 38), and/or may be selected from a variety of available boundaries. For example, the user may import, draw, and/or select the rectangularly shaped outer boundary 100 shown in dashed lines in FIG. 4A or 5A or the irregularly shaped outer boundary 100 of FIG. 6A.

As used herein, the term 'region' encompasses an area of structure 12 that is pathed separately from other regions 102 and optionally as a single tool path. A region 102 may define all or part of a layer of structure 12 and may be determined in a way that makes pathing simpler and/or improves a desired property of structure 12. Regions 102 of structure 12 may be elongate. At least part of different regions 102 of structure 12 may run transverse to each other and may meet each other and/or intersect. At least part of different regions 102 of structure 12 may run parallel to each other.

Computing device 16 may be configured to generate one or more tool paths 51 within region 102. These tool path(s) 51 may guide machine 14 to discharge material at the boundary and thereby form a surface of structure 12 and/or inside of the boundary as infill that supports the surface. In some arrangements, tool path(s) 51 within a single layer of structure 12 may be arranged such that the surface and the infill are formed from a single continuous reinforcement. In some arrangements multiple segments of continuous reinforcements may be required and/or desired to separately form the surface and infill of a single layer.

To generate tool path(s) 51, computing device 16 may divide region 102 into two or more partitions 52 utilizing one or more partitioning lines 54 (Step 305). Partitioning lines 54 may extend from the outer boundary 100 across at least part of region 102 and be straight or curved and 2D or 3D. In some arrangements, partitioning lines 54 may extend across the entire region 102 and cross the outer boundary 100 in two places (e.g., as in FIGS. 4A and 5A). In some arrangements, partitioning lines 54 may extend across only a part of region 102 (e.g., as in FIG. 6A). Partitioning lines 54 may or may not form an enclosed area within region 102. Multiple different types of partitioning lines 54 may be placed on region 102, and each type may drive different operations.

Figure 4A:
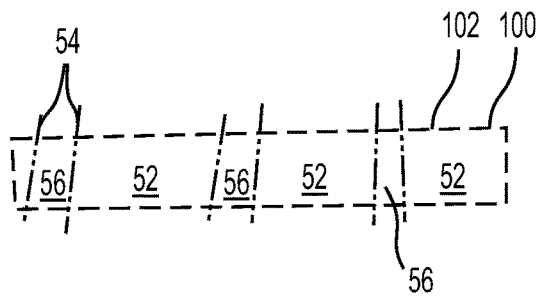
FIGS. 4A, 5A and 6A are schematic illustrations of a region of a structure to be fabricated by the machine of FIG. 1.

As shown in the exemplary arrangement of FIG. 4A, a first type of partitioning lines 54 are placed in pairs. In this example, each pair of partitioning lines 54 may define an intersection lane 56 therebetween. Intersection lane 56 defines a location at which tool path 51 will cross region 102 and may define a location of an intersection of tool path(s) 51. It should be noted that partitioning lines 54 making up intersection lane 56 need not be parallel. The placement of partitioning lines 54 relative to each other and relative to the outer boundary 100 of region 102 that they cross may affect a location, orientation, and/or curvature of the tool path(s) 51 that will intersect within each lane 56. It is noted that the pairs of partitioning lines 54 defining intersection lanes 56 shown in FIG. 4A may also be utilized in the irregular boundary and seam arrangement of FIG. 6A (discussed below).

Figure 5A:
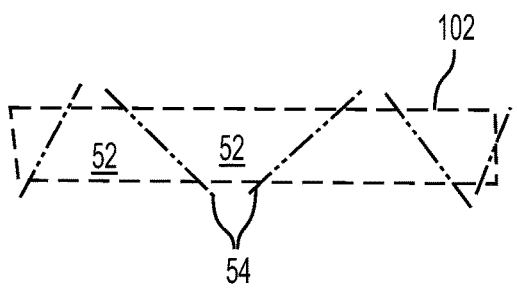

As shown in the exemplary embodiment of FIG. 5A, a second type of partitioning line 54 is placed as an individual line independent of other partitioning lines 54 within the same region. In this example, each partitioning line 54 may itself define a location at which tool path(s) 51 cross region 102 and may define a location of an intersection of the tool path(s) 51. As in the example of FIG. 4A, the placement of partitioning lines 54 relative to each other and relative to the outer boundary 100 of the polygon region that they cross may affect a location, orientation, and/or curvature of the infill tool paths 51 within partitions 52. It is contemplated that computing device 16 may cause partitioning lines 54 to be shown on display 34 in different ways (e.g., in different colors, different line styles or weights, etc.) to signify characteristics of the particular type of partitioning line 54 used.

Many different strategies may be utilized to place partitioning lines 54. In one example, individual or paired partitioning lines 54 are manually placed across the boundary of region 102 (e.g., via I/O device(s) 38). Partitioning lines 54 may be placed to achieve a desired load that structure 12 is required to withstand, a desired appearance, a desired infill shape or density, a desired strength, a desired weight distribution, a desired intersection with or avoidance of a feature, or another desired property. In another example, a template including a plurality of partitioning lines 54 may be selected from among a variety of different templates. The template may be positioned, oriented and scaled over region 102 based on the desired property. In another example, default partitioning lines 54 may be automatically placed in a default manner. Thereafter, adjustments may be made to the position, orientation, scale, etc. (e.g., based on the desired property). In yet another example, partitioning lines 54 may be placed based on a shape of region 102, a size of region 102, features of region 102, and/or results of an analysis. The placement may be undertaken manually by a user or may be undertaken by processor 36 based on data relating to the desired property.

The analysis may include modeling a behavior of structure 12 under a given condition. This may allow an estimate of the desired property to be determined. In some arrangements, modeling a behavior of structure 12 may include generating a property (e.g., force, displacement, heat transfer, conductivity, radiation, etc.) vector field through region 102 and/or undertaking a finite element analysis (FEA) of region 102. In these examples, partitioning lines 54 and/or the template may be positioned, oriented and/or scaled based on the vector field and/or a distribution map from the FEA. For example, partitioning lines 54 may be positioned, oriented and/or scaled such that sections of tool path(s) 51 are substantially aligned with a direction of one or more property vectors. Such alignment may be parallel to the direction of the one or more property vectors or aligned with the direction of the one or more property vectors within a predefined angle. In a further example, partitioning lines 54 may be positioned, oriented and/or scaled such that the subsequently fabricated structure 12 is able to withstand a required load or force.

After partitioning lines 54 have been extended across region 102, computing device 16 may generate one or more tool path(s) 51 (step 310). As discussed above, tool path(s) 51 may navigate some or all of the outer boundary 100 and/or cross through region 102 based on the placement of the partitioning lines 54. In one arrangement, an exemplary tool path 51 circumnavigates region 102 and crosses region 102 at lane(s) 56 and/or location(s) where partitioning line(s) 54 have been placed.

Figure 4B:
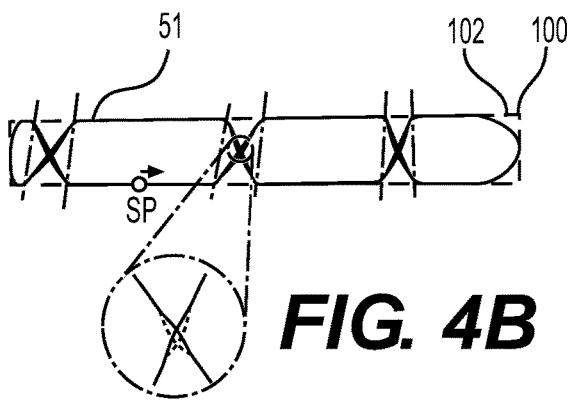
FIGS. 4B, 5B and 6B are schematic illustrations of the regions of FIGS. 4A, 5A and 6A respectively including exemplary tool paths.

Referring to FIGS. 4A and 4B, computing device 16 may apply a walking strategy to generate a tool path 51 that passes around region 102 and through partitions 52 and/or intersection lanes 56 (Step 310). This may include, for example, determining a starting point (SP) for a given tool path 51. The starting point may be selected by a user, generated by computing device 16 based on a desired property, and/or generated by computing device 16 and adjusted by a user. The starting point may lie on the outer boundary 100 of region 102. It should be noted that computing device 16 may be configured to inhibit starting points of adjacent layers of structure 12 from aligning with each other, as this alignment could result in undesired properties within structure 12.

From the starting point, computing device 16 may extend tool path 51 along the outer boundary 100. In one arrangement, a direction of tool path 51 away from the starting point may alternate between layers or stacks of layers (e.g., extending to the right relative to the perspective of FIGS. 4B and 5B, and then to the left in a subsequent layer or subsequent stack of layers). Tool path 51 may be shown by computing device 16 in a manner (e.g., color, line style, etc.) different from the boundary lines of the polygon and partitioning lines 54.

Figure 5B:
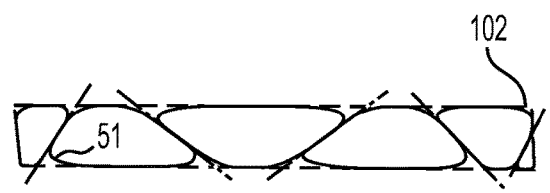

Tool path 51 extends away from the starting point and, based on the positioning of a partitioning line(s) 54, tool path 51 may be steered away from the boundary line and across region 102. This may occur at the point where tool path 51 encounters a partitioning line 54 or at a predetermined point before tool path 51 encounters a partitioning line 54. It will be appreciated that the predetermined point may be determined based on a minimum or desired bend radius of tool path 51. For the remainder of the description of FIGS. 4A-6B, the predetermined point is not referred to, although it will be appreciated that it might be applied at any junction where there is a deviation of tool path 51. As shown in FIG. 4B, when the encountered partitioning line 54 is of the paired type, tool path 51 may be extended from the junction of the original boundary line and partitioning line 54 diagonally across intersection lane 56 to a catacorner junction. As shown in FIG. 5B, when the encountered partitioning line 54 is of the independent type, tool path 51 may be extended across region 102 at least partially along partitioning line 54. In exemplary arrangements, tool path 51 may follow the entire partitioning line 54 across region 102 (accounting for minimum bend radius). In exemplary arrangements, tool path 51 may extend from the junction of the original boundary line and partitioning line 54 diagonally across only the partitioning line 54. Referring again to FIG. 4B, when tool path 51 encounters the outer boundary 100 at the catacorner junction, computing device 16 may deviate tool path 51, such that it extends away from the catacorner junction along the newly encountered boundary line. This deviation may be in a direction to continue circumnavigation of region 102. Specifically, relative to the current direction of propagation of tool path 51, deviation away from the outer boundary 100 across region 102 may be in a first direction left or right. After the deviation left or right, the current direction of propagation of tool path 51 has changed as it progresses across the region. Deviation from region 102 to align with the newly encountered outer boundary 100 may be in the opposite direction (left or right) relative to the current direction of tool path 51. That is, if the deviation away from the outer boundary 100 is left (relative to the direction of tool path 51 as it follows the outer boundary 100) then the deviation of tool path 51 as it aligns with the newly encountered outer boundary 100 is right (relative to the direction of tool path 51 as it crosses region 102), and vice-versa. This may continue around region 102 until tool path 51 returns to the starting point.

Computing device 16 may then identify any intersections where the tool path 51 crosses over itself or over another tool path 51 within the same layer (Step 315). This will occur, for example, within intersection lanes 56 and along the independent partitioning lines 54. In order to maintain a height or z-dimension at each intersection that is substantially the same (e.g., within engineering tolerances) as a height or z-dimension at the outer boundary 100 over a plurality of layers, the intersection location of tool path 51 may be selectively split and/or shifted between differing layers (Step 320).

In arrangements, legs of an intersection in a first layer may be laterally shifted relative to corresponding legs in a second layer of structure 12. For example, when completing tool path 51 of a first layer, one or both of a first leg and a subsequent second leg of tool path 51 may be laterally shifted an offset distance to one side (e.g., to the left) of a desired intersection location (shown in solid lines within enlarged portion of FIG. 4B). Likewise, when completing a subsequent layer, one or both of the first and second legs of tool path 51 may be shifted to an opposing side (e.g., to the right) of the desired intersection location (shown in dashed lines within enlarged portion of FIG. 4B). The shifting directions and/or offset amounts may be varied between the first and second legs and/or between alternating layers of structure 12, such that for every set number of (e.g., for every two) layers of structure produced by machine 14, the intersection location of tool path 51 increments in the height or z-dimension direction by a thickness of the set number of layers (e.g., by two diameters of the corresponding reinforcement). In some arrangements, the aggregated height or z-dimension at the intersection may be substantially the same as the aggregated height or z-dimension over of the set number of layers.

It should be noted that, in some instances, machine 14 may not be capable of depositing reinforcement(s) along a particular tool path 51 generated via Steps 300-320. For example, tool path 51 may have junctions and/or intersections that are too sharp or have too small of a radius for support 18 to accurately move print head 20 along. In another example, the reinforcement being used may have a minimum bend radius or other limitation that prevents its placement along tool path 51. In yet another example, the matrix being used may have a minimum bend radius required for sufficient tack of the reinforcement. In any of these examples and others, tool path 51 may be manipulated by computing device 16 to conform to any associated limitations (Step 325). As shown in FIGS. 4B and 5B, this may include computing device 16 smoothing out junctions and/or intersections, tightening or loosening of radiuses, adding or subtracting of tool path passes along boundary lines, shifting of tool path segments, etc. based on one or more pre-programmed limitations of machine 14 and/or the materials to be discharged by machine 14 along tool paths 51. In exemplary arrangements, constraints related to tool path(s) 51 along which machine 14 is capable of depositing reinforcement(s) may be known and tool path(s) 51 may be generated such that those constraints are met.

In exemplary instances, a user may be unsatisfied with the particular tool path 51 generated via steps 300-320. For example, a user may desire a different intersection location, a different curvature, a thickness of walls at the outer boundary 100 of region 102 within each layer, avoidance of a region feature, closer approximation of region 102 shape, etc. In any of these examples, computing device 16 may be configured to show tool path(s) 51 on display 34 and receive input from the user regarding desired changes (Step 330).

After manipulation of previously generated tool path(s) 51 (if any) either by a user or computing device 16, tool path(s) 51 may be output for subsequent use by machine 14 in fabricating structure 12 (Step 335). For example, machine code may be compiled, stored within a memory device, transmitted to machine 14, or otherwise output in a manner that is suitable for controlling machine 14 to deposit material along tool path 51.

It is contemplated that the exact same tool path 51 may be utilized for every layer of structure 12, that tool paths 51 for each layer of structure 12 may all be different, that some tool paths 51 for layers of structure 12 may be identical and others different, and/or that tool paths 51 for layers of structure 12 may scale, merge, and/or split at different layers. For example, in one application, it may be desirable for structure 12 to taper along a height or z-direction. In this example, after advancing the taper to a certain layer, a region that previously was large enough to accommodate a particular toolpath 51 could become too small. In this situation, one or more partitions 52 and/or intersection lanes 56 may need to merge or absorb into an adjacent partition 52 and/or intersection lane 56. Similarly, a reverse taper of structure 12 may create partitions 52 and/or intersection lanes 56 that become too large at a particular layer for a given tool path 51 to fill adequately. In this example, the partition(s) 52 and/or intersection lane(s) 56 may need to be split apart into smaller partition(s) 52 and/or intersection lane(s) 56. In one application, it may be possible for growing or shrinking layers to have tool paths 51 that overlap in undesirable ways (e.g., that extend too far unsupported).

Figure 6A:
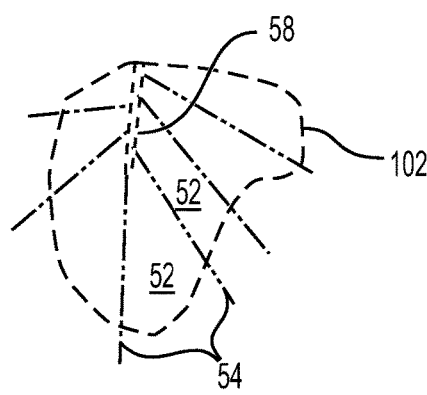
Figure 6B:
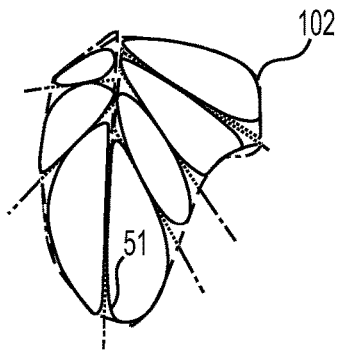

FIGS. 6A and 6B illustrate an exemplary irregular outer boundary 100. In this instance, following Steps 300-335 may not generate a tool path 51 that is acceptable to the user. It is contemplated that prior to executing Step 305 (e.g., prior to extending partitioning lines 54), region 102 may be selectively adjusted. For example, a seam 58 may be created inside of region 102, and the partitioning lines 54 may thereafter be extended from one edge of the outer boundary 100 to the newly created seam 58. It is contemplated that seam 58 may have a zero or non-zero volume, as desired, and any size or shape selected or created by the user. In one example, seam 58 is open to an exterior of region 102 and closed to an interior of region 102, such that a subsequently generated tool path 51 will follow along an internal side of seam 58 as it would a normal section of the outer boundary 100 of region 102. In another example (not shown), seam 58 may be completely enclosed and placed entirely within the outer boundary 100 of region 102 to form an island, to which partitioning lines 54 may be extended.

Figure 7:
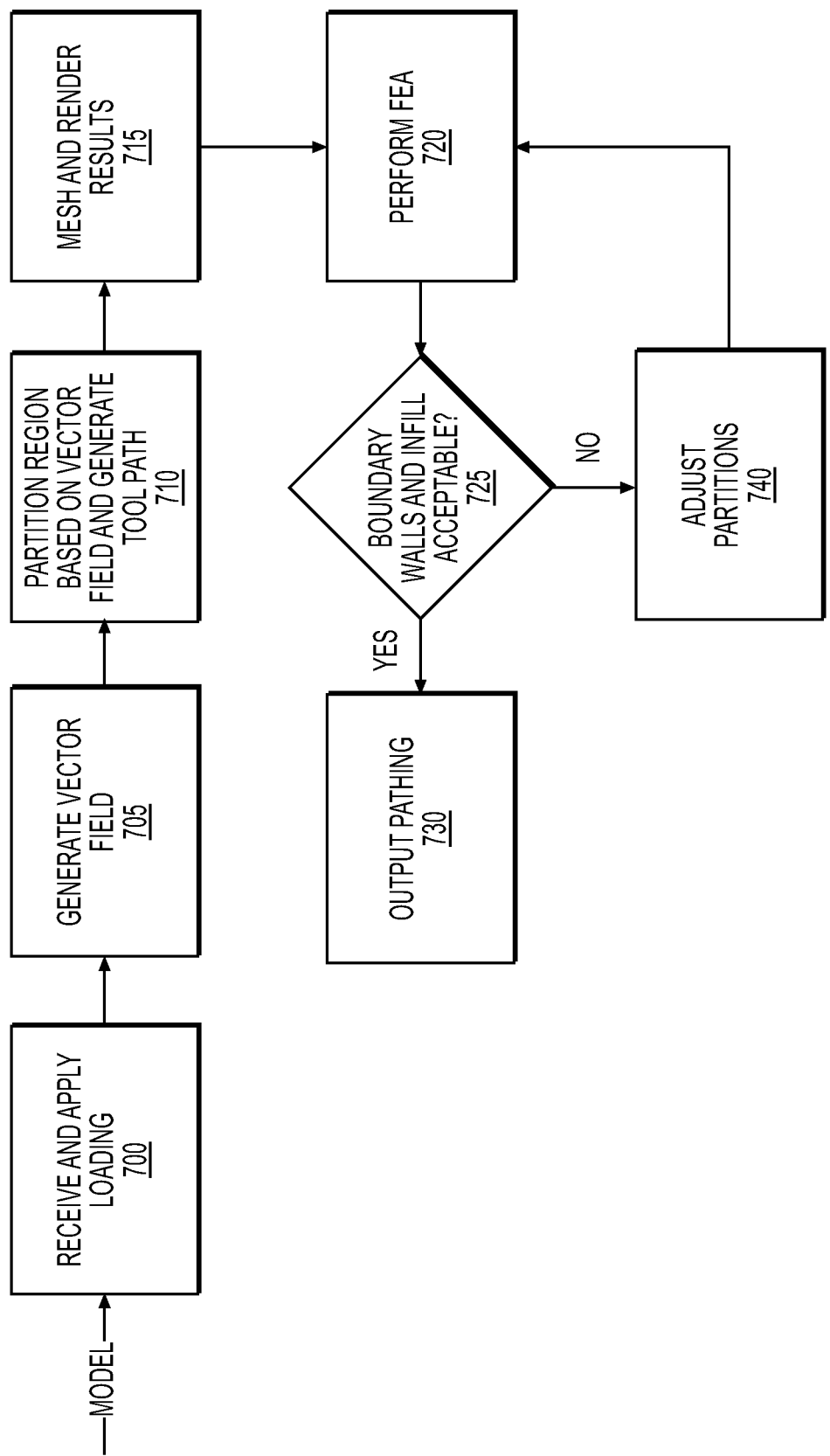
FIG. 7 is a flowchart representing an exemplary method that may be implemented by the control system of FIGS. 1 and 2.
Figure 8:
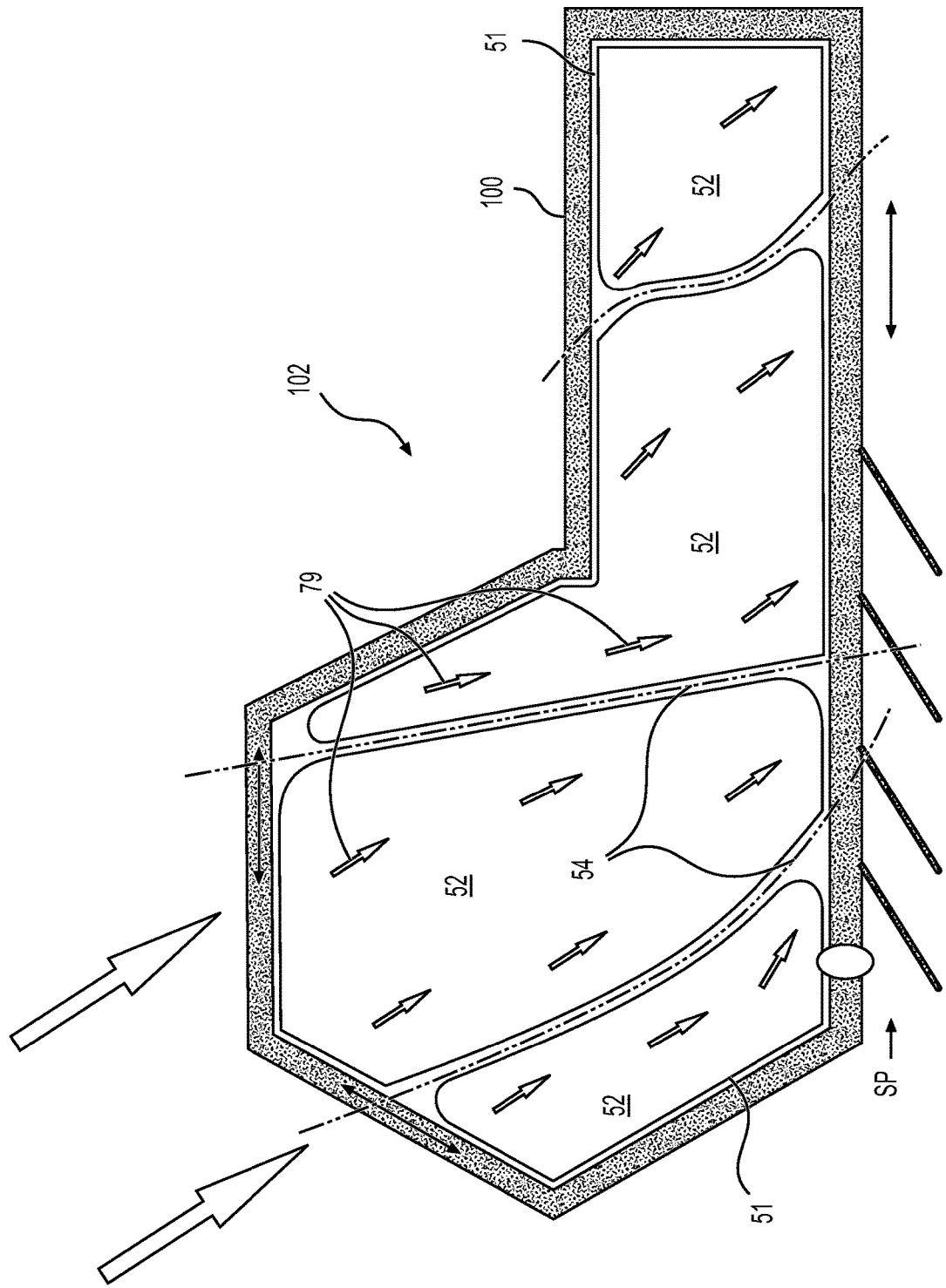
FIG. 8 is a schematic illustration of a vector field through a region of a structure to be fabricated by the machine of FIG. 1.

As indicated above, in regard to Step 305, it is contemplated that partitioning lines 54 may be placed by computing device 16 across region 102 based on analysis. FIGS. 7 and 8 provide and illustrate an exemplary method for doing this. As shown in FIGS. 7 and 8, a first step may include modeling behavior of structure 12 under expected loading conditions during intended use (Step 700). Computing device 16 may then responsively determine, for the desired property, one or more vector field(s) passing through region 102 at the given layer of structure 12 (Step 705). In one example, computing device 16 may generate a force-based vector field (e.g., a constant linear field, a cylindrical field, a radial field, and/or a complex field of multiple types) through the polygon using the load conditions received at Step 700. This analysis may be simple and require little processing time and power, as high-accuracy in these initial results may not be critical.

In some embodiments, generation of the vector field may be customizable. For example, the user may have an option of choosing different relationships governing how the vector field is to be generated. For example, the user may be able to select a decay rate of forces (or other parameters) within the vector field (e.g., based on a distance from a location at which the loading condition(s) are applied) or stipulate that the vector profile should be cylindrical, linear, and/or radial. It is also contemplated that the vector field(s) may be generated via user input (i.e., the user may be able to draw or otherwise place the vector field). Alternatively, after generation of the vector field(s), the user may be able to manually adjust (e.g., push, pull, rotate, stretch, etc.) the field(s). In yet other embodiments, the vector field(s) may simply be imported from a file. The vector field is represented in FIG. 8 by arrows 79.

As discussed above, computing device 16 may be configured to then generate a virtual layout (e.g., trajectories) of partitioning lines 54 relative to region 102 based on the vector field, or other analysis. In the example of FIG. 8, partitioning lines 54 are substantially aligned with arrows 79 representing the direction of the vector field. As discussed above, partitioning lines 54 may divide region 102 into partitions 52 and be used to generate tool path(s) 51 via the method of FIG. 3 discussed above (Step 710). Computing device 16 may generate the layout by generally aligning trajectories of partitioning lines 54 with the field vectors and spacing partitioning lines 54 based on a magnitude of the vectors, for example having a smaller spacing as magnitude increases and vice-versa. Partitioning lines 54 may be positioned, oriented and/or scaled so as to generate sections of tool path 51 crossing region 102 that are generally aligned with the vectors and spaced based on a magnitude of the vectors. It should be noted that the vector field(s) may be as coarse or refined as desired. However, when a coarser vector field is utilized, some interpolation between vectors in the field may be required when aligning and spacing partitioning lines 54.

After completion of Step 710, computing device 16 may generate a mesh (e.g., a 2D mesh) across a surface of region 102 and render the results on display 34 (Step 715). This may provide an opportunity for the user to make adjustments to the mesh prior to performance of an analysis routine (e.g., FEA—Step 720). It should be noted that the analysis of Step 720 may be conducted based on the layout of reinforcements crossing region 102 and navigating along the outer boundary 100 of region 102 (i.e., as defined by tool path(s) 51) and the associated changes to material properties afforded by the reinforcements placed along the tool paths. That is, the analysis of Step 720 may be performed on region 102, accounting for placement of the continuous reinforcements along the tool path(s) 51. Comparison of the analysis results with one or more threshold requirements may be used to determine if tool path(s) 51 are acceptable (Step 725). When the layout of tool path(s) 51 is acceptable (Step 725:Y), computing device 16 may output the tool path(s) 51 in the manner discussed above.

If at Step 725, it is determined that tool path(s) 51 do not produce desired results (Step 725:N), control may advance to Step 740 instead of Step 730. At Step 740, computing device may be configured to selectively adjust one or more of partitioning lines 54. In one example, at least one end of at least one partitioning line 54 may be selectively stepped along a direction of the associated outer boundary 100. In some instances, both ends of the partitioning line 54 may be stepped (e.g., by the same or different amounts and in the same or different directions), such that the partitioning line is rotated and/or shifted. When both ends of a partitioning line 54 are stepped, they may be stepped independently or simultaneously. After each step enacted at Step 740, control may return to Step 720, where the analysis is performed again. This may continue until performance of tool path(s) 51 is determined to be acceptable at Step 725. In some arrangements, the shape and/or type of partitioning line 54 may be altered at Step 740.

Figure 9:
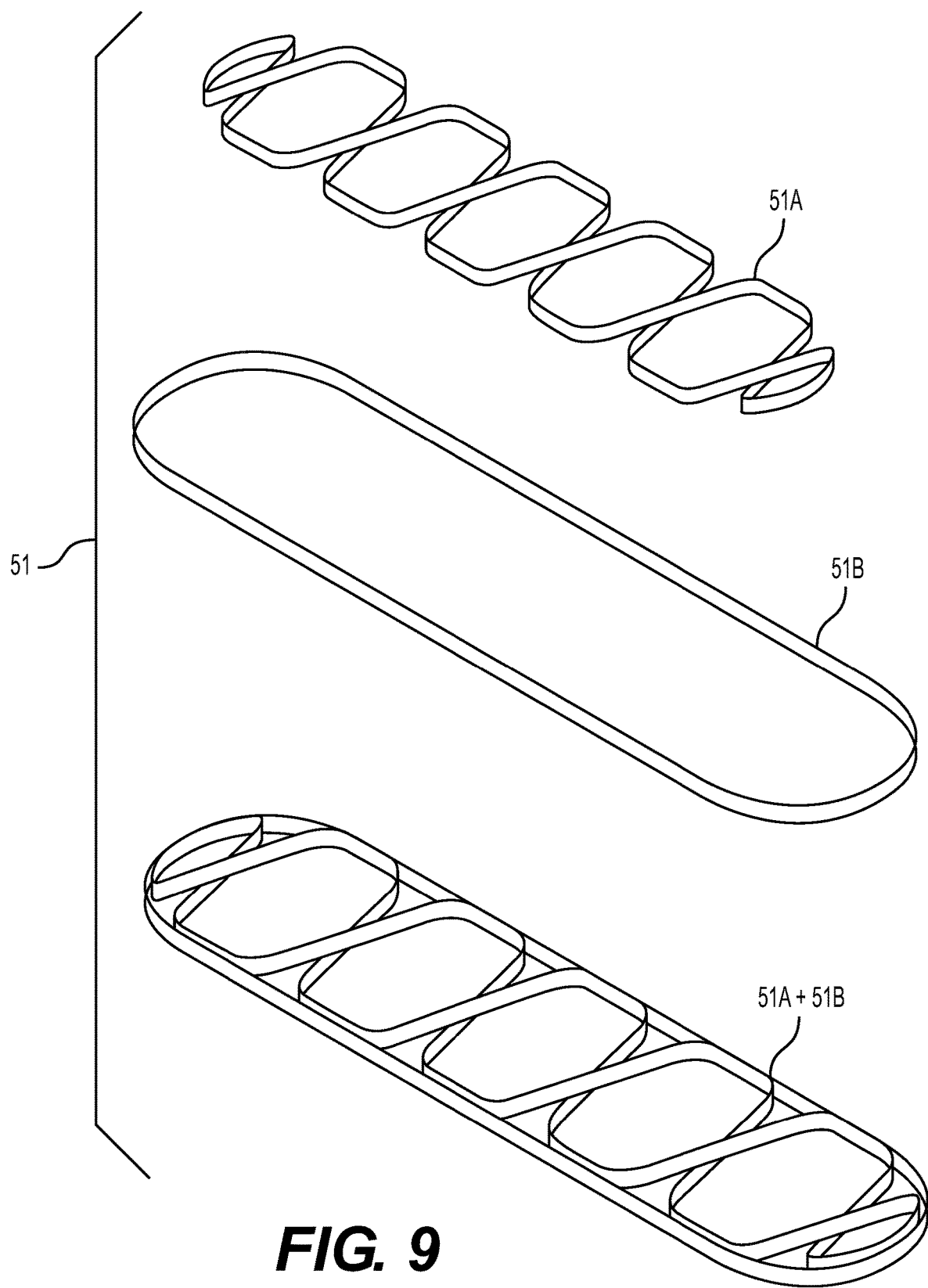
FIG. 9 is a schematic illustration of exemplary tool paths to be used by the machine of FIG. 1 during fabrication of a structure.
Figure 10:
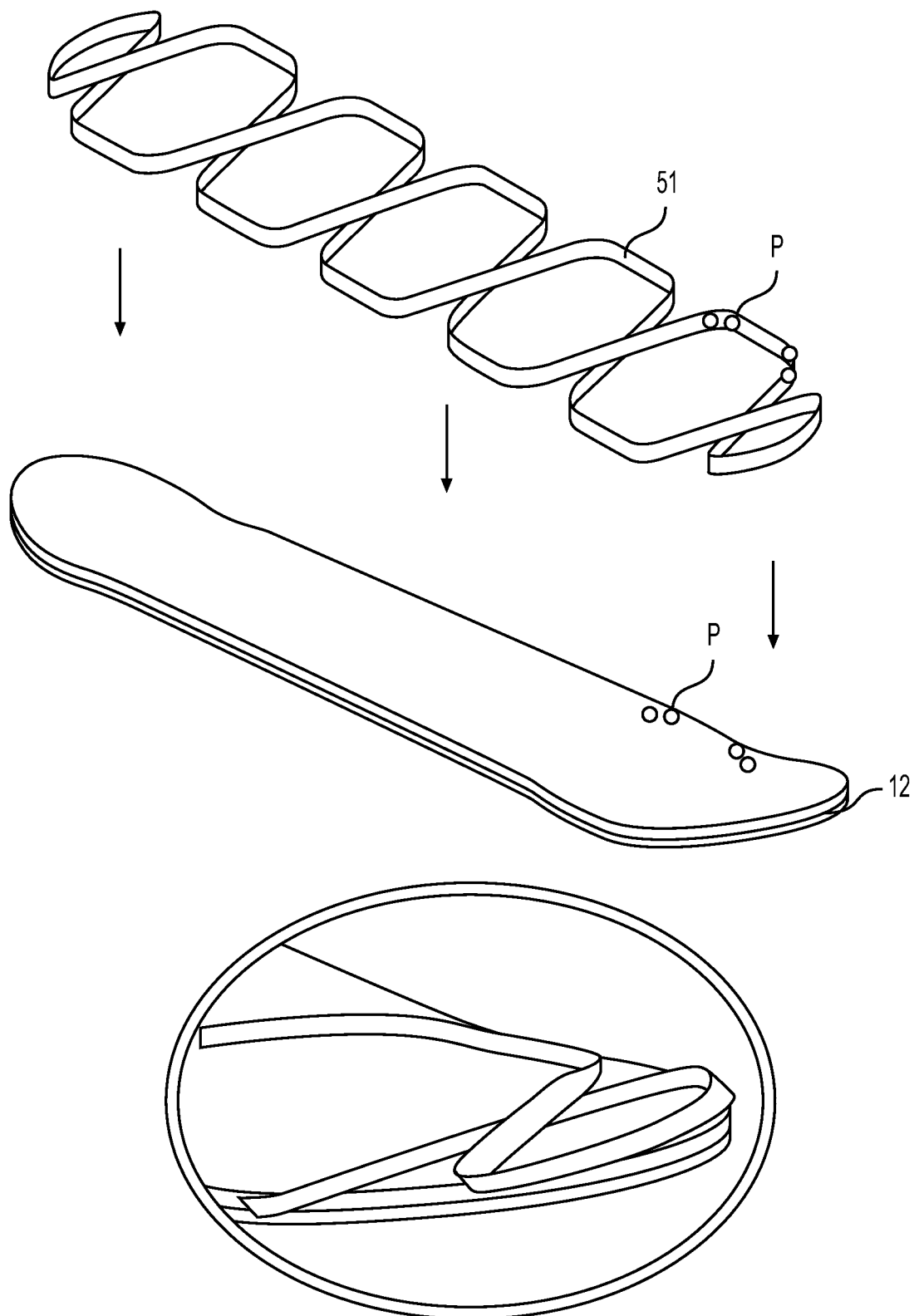
FIG. 10 is a schematic illustration of a planar tool path projected onto a non-planar structure to be fabricated by the machine of FIG. 1.

In some applications, it may be desirable to generate multiple separate tool paths 51 for fabricating a region of a layer. These tool paths 51 may be generated for a region via partitioning as discussed above and/or created via other means (e.g., via a completely manual process, via a different automated or semi-automated algorithm, etc.). In the example of FIG. 9, a first or inner tool path 51A generated via the process of FIG. 3 is used to fabricate infill for structure 12, while a second or outer tool path 51B is used to generate an outer wall, surface, or skin. The second tool path 51B circumnavigates at least part of the outer boundary 100 of region 102 and, in one exemplary arrangement, circumnavigates the entire outer boundary 100. In one example, the second tool path 51B may be generated by simply tracing around the outer boundary 100 of a given region. Tool paths 51A and 51B may be selectively nested within a single layer of structure 12 to include both the infill and the skin. Tool paths 51A and 51B may lie close enough to each other, such that they bond during discharge. Alternatively, tool paths 51A and 51B may be spaced apart from each other and remain separate within the layer. In this latter arrangement, an additional tool path may be deposited between tool paths 51A and 51B to bond tool paths 51A and 51B to each other. Alternatively, an additional tool path may be deposited in an adjacent layer to bond tool paths 51A and 51B to each other. For example, the additional tool path in the adjacent layer may cross over portions of both tool paths 51A and 51B, thereby bonding them together.

There are different options for usage of tool paths 51A and 51B. For example, one of each of tool paths 51A and 51B may be used within separate layers of structure 12. Alternatively or additionally, usage of tool paths 51A and 51B may be alternated between layers or between stacks of layers. In yet another example, tool path 51A may be used alone to fabricate one or more adjacent layers of structure 12, followed by tool path 51B being used alone to fabricate one or more adjacent layers of structure 12, and/or followed by both tool paths 51A and 51B being used together to fabricate one or more adjacent layers. Sequences of any number of different tool paths 51 may also be utilized. Many different combinations are possible.

Figure 11:
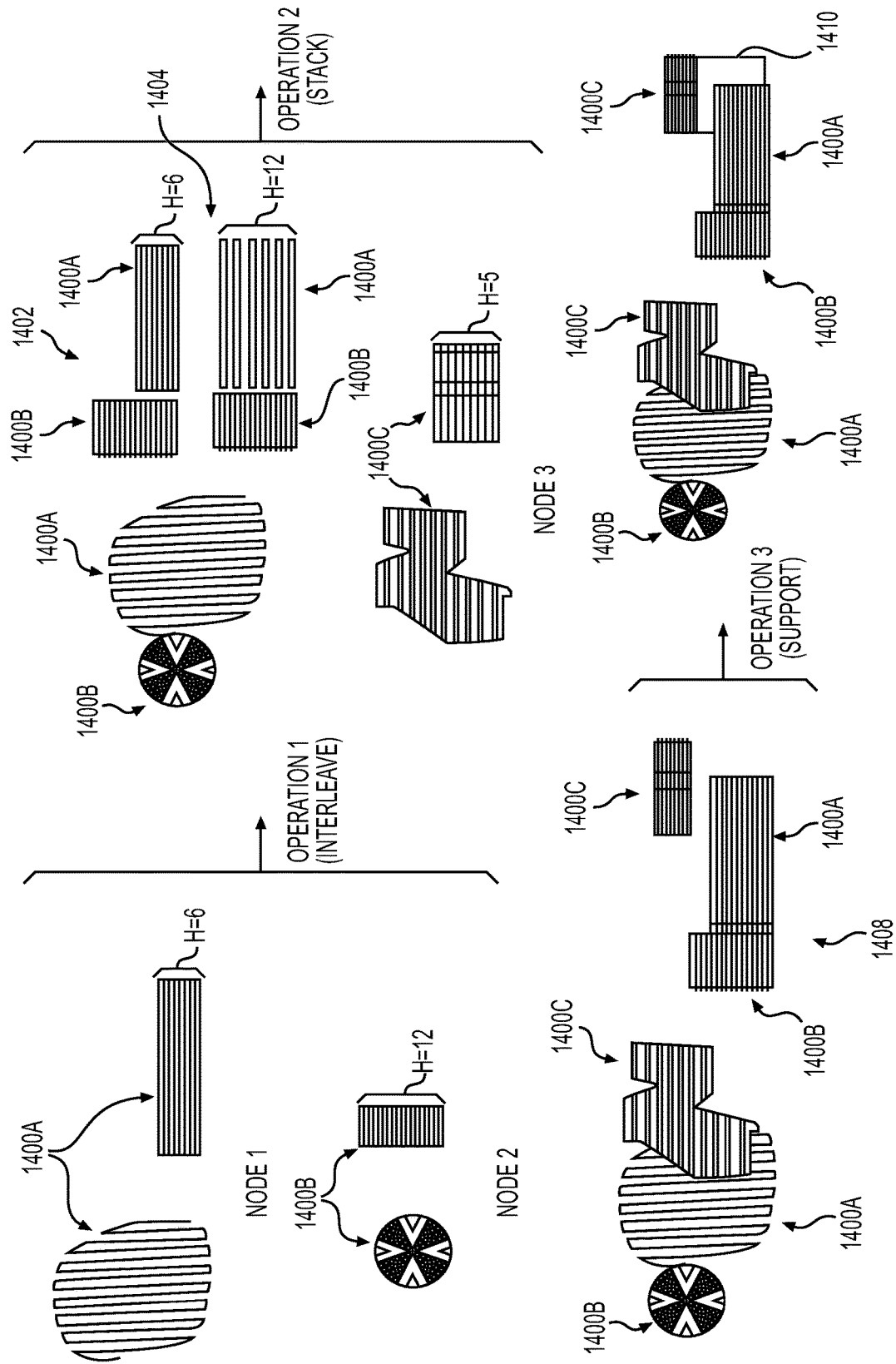
FIGS. 11 and 12 are schematic representations of methods of assembling existing tool paths for use by the machine of FIG. 1.
Figure 12:
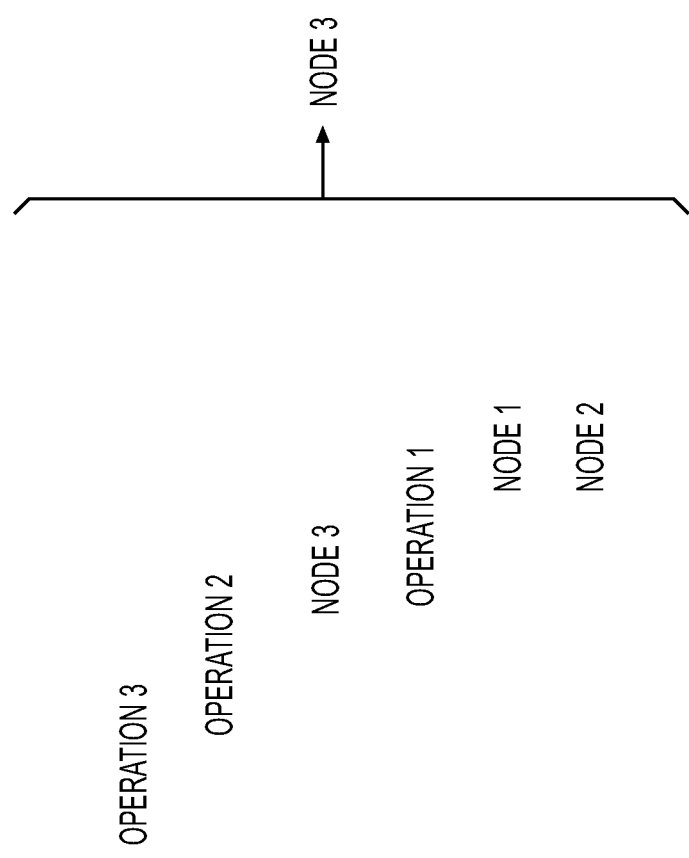

In some instances, it may be desirable to start with multiple existing tool paths 51 and assemble them in different ways to make a desired overall shape of structure 12. An exemplary process is depicted in FIGS. 11 and 12 and outlined in the flowchart of FIG. 13. FIG. 11 shows a plurality of different regional tool paths 1400A, 1400B and 1400C. As used herein, the term 'regional tool path' encompasses a tool path that may be used by additive manufacturing machine 14 to manufacture a specific region of structure 12. The regional tool paths 1400A, 1400B, 1400C may include tool paths generated using any of the methods disclosed herein.

Figure 13:
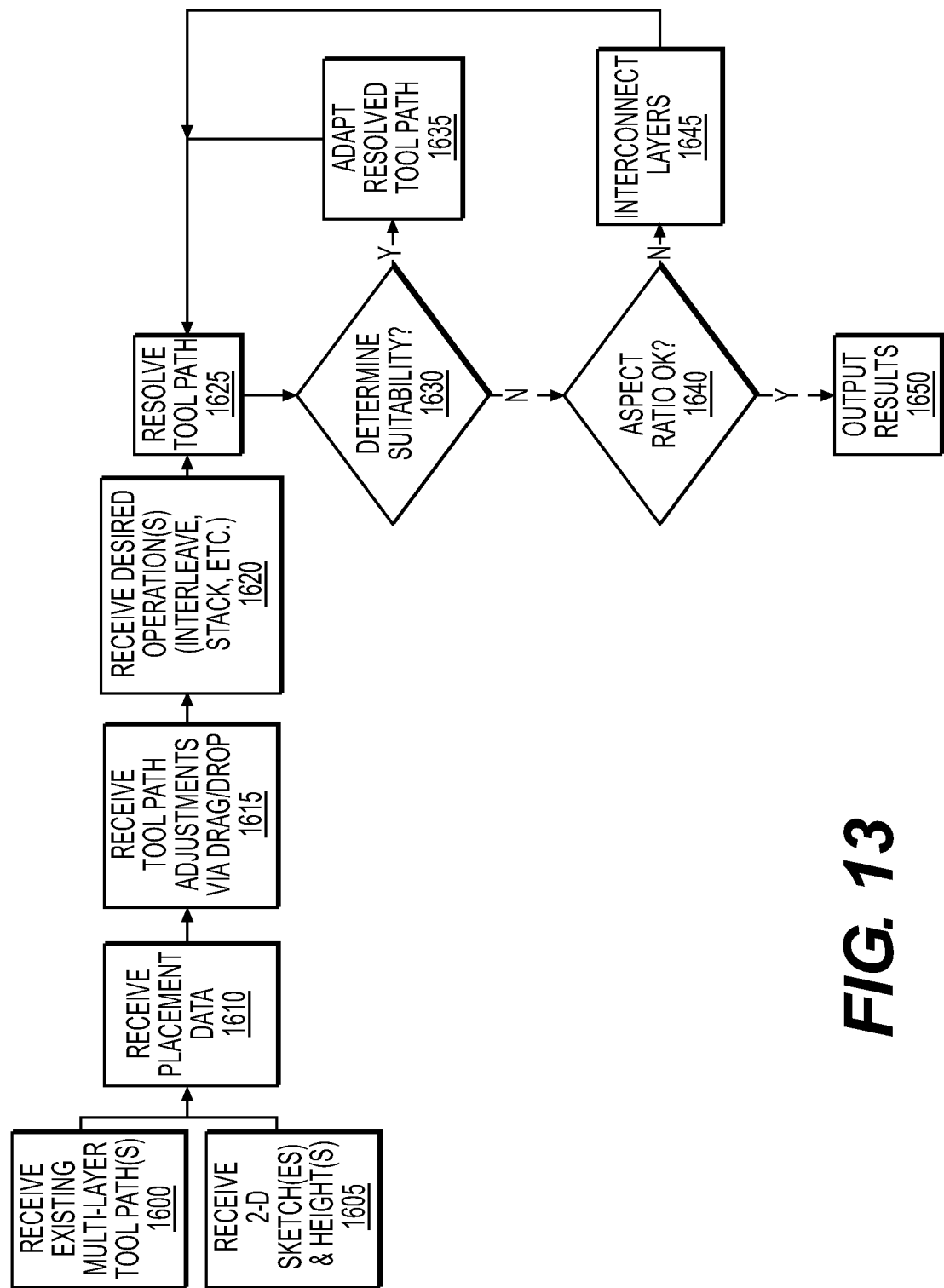
FIG. 13 is a flowchart showing a method of assembling existing tool paths to create a desired shape of a structure to be fabricated by the machine of FIG. 1.

As shown in the flowchart of FIG. 13, the first step(s) to assemble a desired overall shape of structure 12 may include receiving any number of existing regional tool paths 1400A, 1400B, 1400C (Step 1600) to be used along with a desired number of instances where the regional tool paths 1400A, 1400B, 1400C should be duplicated to produce one or more desired heights of structure 12 (Step 1605). In the example of FIG. 11, three different regional tool paths 1400A, 1400B, 1400C have been received by computing device 16 and arranged into three different nodes Node 1, Node 2, and Node 3. For example, Node 1 includes six layers of tool path 1400A, Node 2 includes 12 layers of tool path 1400B, and Node 3 includes five layers of tool path 1400C. Note that the nodes do not need to have the same numbers of layers and/or the same heights (H).

When the nodes are built up from regional tool paths 1400A, 1400B, 1400C by the user and provided to computing device 16, a placement of each node of tool paths within a virtual environment may also be determined by the user. The placement of the nodes may be provided to computing device 16 in the form of placement data, including one or more of a relative lateral position, a relative height position and a relative orientation. The placement data may therefore include relative coordinates and orientations. The user may input the placement data in different ways, such as by manual entering of the coordinates and orientations, drag-and-drop of node representations, and/or sketching of the nodes within the virtual environment.

After receiving the composition and placement data for the nodes from the user, computing device 16 may generate corresponding labels and place the labels within an organizational tree shown on display 34 (Step 1610). In some embodiments, an order of the labels within the tree may correspond with a physical stacking order of the corresponding nodes in a particular direction (e.g., within the height direction) within the virtual environment. For example, Node 3 (including tool paths 1400C) is listed uppermost in the tree of FIG. 12, thereby designating Node 3 as being located at a highest location in the stacking direction. Similarly, Node 2 (including tool paths 1400B) is located lowest and Node 1 (including tool paths 1400B) is located between Nodes 2 and 3. In these embodiments, the user may be able to adjust the order of the labels within the tree (e.g., via drag-n-drop commands of the user received by computing device 16—Step 1615) to thereby change the physical order of the nodes and corresponding stacks of regional tool paths 1400A, 1400B, 1400C in the height direction within the virtual environment. It is also contemplated that the user may be able to adjust a relative location and/or orientation of the nodes in dimensions other than the height direction, if desired.

Once regional tool paths 1400A, 1400B, 1400C have been received by computing device 16 and arranged into nodes within the organizational tree of FIG. 12, computing device 16 may receive one or more operations from the user that relate regional tool paths 1400A, 1400B, 1400C and/or nodes to each other (Step 1620). The operations may be provided to computing device 16 in the form of operation data that is indicative of an operation to be performed in relation to at least one node, and in some cases on two or more nodes. For example, a 'reverse' operation may be undertaken on a single node that reverses the order of the regional tool paths in a given node, and a 'translate' operation may be undertaken on a single node that forms a translated copy of the node (i.e., a copy of the node is positioned elsewhere in the virtual environment). Also, an interleave operation (Operation 1 from FIG. 11) or a stack operation (Operation 2 from FIG. 11) may be required for two or more nodes. The operation data may include one or more operations for connecting the nodes together.

The interleave operation is shown as relating Node 1 (including multiple copies of tool path 1400A) to Node 2 (including multiple copies of tool path 1400B). In this operation, data is created that defines one or more layers of structure 12 assembled from a copy of a layer from Node 1 and a copy of a corresponding layer of Node 2. That is, the data representing the individual regional tool paths 1400A, 1400B from a layer at a common height is combined into data representing a single tool path including the regional tool paths 1400A, 1400B from Nodes 1 and 2 at the same height.

In one illustrated example 1402 shown in the upper right corner of FIG. 11, sequentially overlapping layers of structure 12 include a regional tool path copy from each of Node 1 and Node 2 (i.e., one planar or non-planar layer compiled from two different regional tool paths 1400A, 1400B). In this example, layers of structure 12 including copies of tool path 1400A and tool path 1400B) may extend only to a height of the shortest Node (in this case, Node 1) and the regional tool paths 1400B of the taller Node (in this case, Node 2) may extend beyond the final layer of Node 1. In another example 1404 shown below example 1402 in FIG. 11, only particular layers of structure 12 include a regional tool path copy from each of Node 1 and Node 2, while other layers include only a regional tool path copy from Node 1. In this example, sequential tool path copies from the shortest Node (in this case, tool paths 1400A) may be spaced apart from each other in a height or z-dimension (e.g., by two or more layers).

The stack operation is shown in FIG. 11 as relating the compilation of Node 1 and Node 2 to Node 3. In this operation, the layers of Node 3 are simply stacked at some height above the compilation of Node 1 and Node 2. In some embodiments, Node 3 is positioned such that the lowest layer of Node 3 is stacked directly on top of a highest layer of the compilation. In other embodiments, Node 3 is positioned such that the lowest layer of Node 3 is spaced apart from the highest layer of the compilation (e.g., such that a space exists therebetween).

The organizational tree includes the operations to be performed, the node(s) on which the operations are to be undertaken, an order in which nodes are to be positioned, and an order in which the operations are to be undertaken. Completion of all the user-defined operations in the tree may be considered "resolving" the regional tool paths (Step 1625) into a fewer number of (e.g., one or more) resolved tool path(s) 1408. Resolving the tool paths may serve to bond the regional tool paths 1400A, 1400B, 1400C together.

It should be noted that, in some instances, the resolved tool path(s) 1408 may not yet be ready for output to and consumption by machine 14. For instance, gaps and/or overhangs between and/or under the tool paths 1400A, 1400B, 1400C may exist that would cause machine 14 to fail in fabrication of structure 12 using the resolved tool path(s) 1408. Accordingly, computing device 16 may determine a suitability of resolved tool path(s) 1408 for use with machine 14 based on one or more predefined criteria (Step 1630). For example, computing device 16 may check for gaps and/or overhangs that exceed allowable thresholds, although other criteria may be used. The predefined criteria may relate to operational constraints of machine 14 and/or a property of structure 12 during and/or after manufacture.

Computing device 16 may adapt resolved tool path(s) 1408 based on the determined suitability (Step 1635). In some exemplary arrangements, adapting the resolved tool path(s) may include amending placement and/or operation data. In some exemplary arrangements, adapting resolved tool path(s) 1408 includes creating a support tool path. In cases where a gap is identified, the support tool path may connect the two or more regional tool paths between which the gap exists. In cases where an identified overhang exceeds an overhang threshold value, the support tool path (e.g., support path 1410) may be formed to support or brace the overhanging part of the resolved tool path(s) 1408.

Before or after completion of Steps 1630 and 1635, computing device 16 may be configured to consider an aspect ratio of the structure 12 to be fabricated using the resolved tool path(s) 1408 (Step 1640). In embodiments, this may be undertaken as part of determining suitability of resolved path(s) 1408. For example, during fabrication of structure 12, machine 14 may deposit material along the resolved tool path(s) 1408 that creates separate free-standing features of structure 12. In some applications, the free-standing features may be tethered to each other at ever layer. In other applications, however, the free-standing structures may be connected only after multiple layers have been deposited. In these latter applications, the features could become unstable at a given height prior to connection if the aspect ratio of the features is too high. Accordingly, computing device 16 may consider the aspect ratio of features of structure 12 during fabrication based on the resolved tool paths) 1408. Based on the determined aspect ratio (e.g., if the determined aspect ratio is above an aspect ratio threshold value), computing device 16 may selectively generate support tool path(s) or extend (or otherwise amend) existing parts of resolved tool path(s) 1408 to brace or tether the high aspect ratio features. For example, the generated support tool path(s) and/or the extended existing parts of resolved tool path(s) 1408 may interconnect high aspect ratio features with other parts of resolved tool path(s) 1408 at particular locations within particular layers (Step 1645). It is contemplated that this interconnection may be implemented by computing device 16, implemented under the guidance of a user, or a combination of these methods.

For example, the user may be able to instruct that high-aspect ratio features of the resolved tool path(s) 1408 are interconnected within every layer of structure 12, that only particular high aspect ratio features of the resolved tool path(s) 1408 are interconnected within every layer, and/or that only particular high aspect ratio features of the resolved tool path(s) 1408 are interconnected within only particular layers. In addition, the user may allow or disallow automatic interconnection in addition to or instead of manual interconnection. In some instances, the user may be able to instruct where and/or how interconnection is to occur, while in other instances, computing device 16 may make these decisions based on efficiency, strength, material usage, and/or other considerations. Control may proceed from Step 1645 to Step 1625, at which any interconnections are resolved with the existing resolved tool path(s) 1408.

It is noted that in other embodiments, determining the suitability of a tool path may be embodied in an operation that a user may place in the organizational tree of FIG. 12 and that may be resolved along with the other operations. For example, there may exist a "support overhang" operation, a "fill gap" operation and/or an "aspect ratio" operation.

After completion of Steps 1640:Y, computing device 16 may compile and output machine code including instructions for controlling machine 14 based on resolved tool path(s) 1408. The compiled instructions may be stored and/or used by computing device 16 to control machine 14 to manufacture the structure based on resolved tool path(s) 1408. Machine 14 may use these tool paths 51 to regulate motion of support 18 and head 20.

FIGS. 14, 15 and 16 illustrate a method of determining tool paths for use in additively manufacturing structure 12. In one example, a propagation surface may be established via data received (Step 2400) by computing device 16. The propagation surface may form a base onto which material may be deposited in layers to build up structure 12 in a propagation direction. The propagation surface may correspond with an exposed surface 60 of a build platform or other anchor point 32 and/or an existing surface of structure 12.

One or more propagation boundaries 62, 64, 66 may also be determined (Step 2402). Each of the propagation boundaries 62, 64, 66 may be identified as a mesh associated with a model of structure 12 in a virtual environment. The mesh may be determined by computing device 16 using any of the methods described herein and/or known in the art, or may be determined by a user and received as data by computing device 16. One or more of the propagation boundaries 62, 64, and/or 66, together with the propagation surface, may define an enclosed volume.

It will be appreciated that each propagation boundary may have any shape (e.g., 2D or 3D) and be formed by placement on, adjacent and/or around propagation surface 60 and/or via projection toward propagation surface 60. For example, propagation boundary 62 may be a five-sided irregular box (e.g., including surfaces 62A and 62B) that is placed on propagation surface 60 to enclose a volume. Alternatively, propagation boundary 62 may simply be a three-dimensional surface or outline (e.g., 62B) that is projected toward propagation surface 60 (e.g., in a direction normal to propagation surface 60 or surface 62B at a particular point in space), thereby defining the same or another enclosed volume defined by the irregular box. Other methods for defining a propagation boundary may also be utilized.

A portion of propagation surface 60 that is contained by the boundary 62 (e.g., within the side walls of surface 62A) may define an area on which material is to be deposited when manufacturing structure 12. As discussed below, each structure layer of structure 12 may be determined such that it propagates through the enclosed volume in a propagation direction 70 (referring to FIG. 15). Propagation direction 70 may be defined by propagation surface 60 and, as in the case of FIG. 14, may be substantially normal to the surface. In the simple case of planar propagation surface 60, offsetting each structure layer may be a simple process. But as discussed below, in other cases, some correction may be required.

The first layer of material (structure layer) to be deposited on propagation surface 60 may be considered a base layer 68. Base layer 68 is offset from propagation surface 60 in propagation direction 70 by a distance equivalent to a thickness or height of a material to be deposited. Base layer 68 is contained within boundary 62. That is, boundary 62 defines a lateral extent of base layer 68. Base layer 68 may be 2-dimensional or 3-dimensional (i.e., non-planar). In instances when base layer 68 is 3-dimensional, base layer 68 may be mapped into 2-dimensions prior to pathing. Base layer 68 may be mapped into 2-dimensions using a surface or mesh parameterization algorithm, for example UV parameterization. UV parameterization maps a 3-dimensional surface to 2-dimensional space by trading off angular and spatial relationships of features of the 3-dimensional contour after it is mapped to 2-dimensions. That is, if an angle between features on a 3-dimensional surface are preserved when mapping the surface to 2-dimensional space, then a spatial relationship between those features will be distorted, and vice-versa. This can be seen in the example of the globe parameterized to a 2-dimensional world map, and in which certain countries appear larger than they actually are because angular relationships have been preserved at the expense of spatial relationships. In exemplary arrangements, surface parameterization may be undertaken so as to preserve a spatial relationship of features of base layer 68 (or other structure layers 72), as opposed to preserving angular relationships. This means that tool paths generated in 2-dimensional space as adjacent to one another, remain adjacent to one another when they are mapped back to the 3-dimensional surface. The mapping may include discretizing the 3-dimensional base layer into points in a local, 2-dimensional coordinate system.

A tool path may then be generated (Step 2408) for the base layer 68 and may be considered a base tool path. The base tool path is a virtual trajectory along which machine 14 should deposit material during fabrication of the base layer 68 of structure 12. The base tool path may be generated using any method described herein, in whole or in part, or using any method known in the art.

Figure 17:
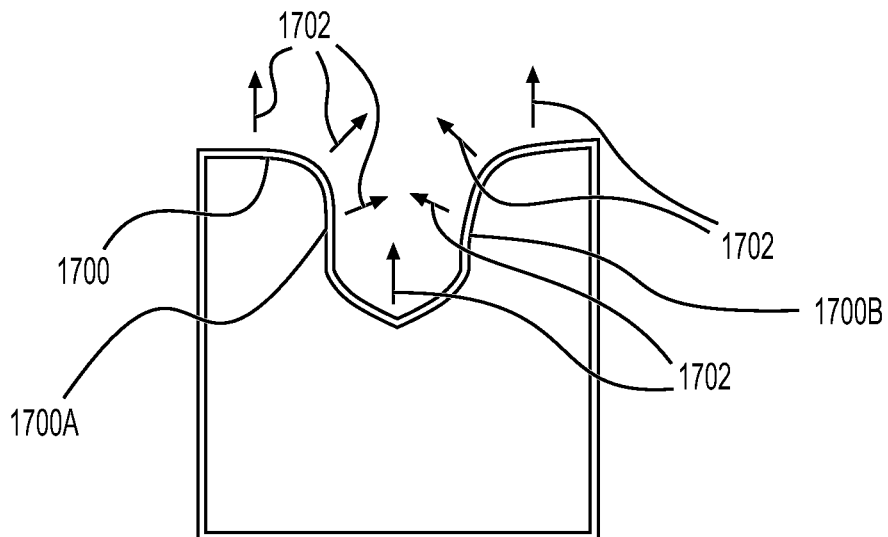
FIGS. 17-19 are schematic illustrations of a process for removing self-intersection from a propagated layer of a structure to be fabricated by the machine of FIG. 1.
Figure 18:
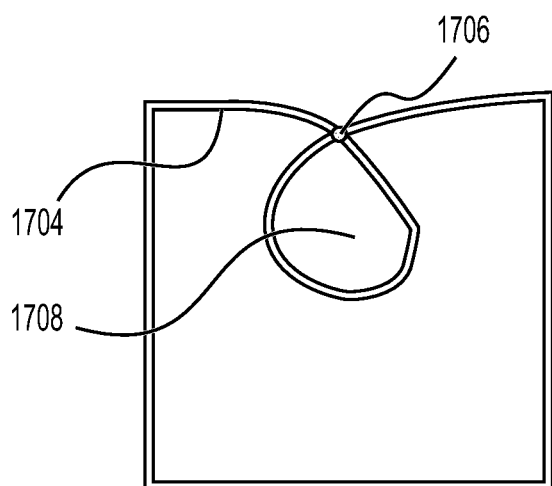
Figure 19:
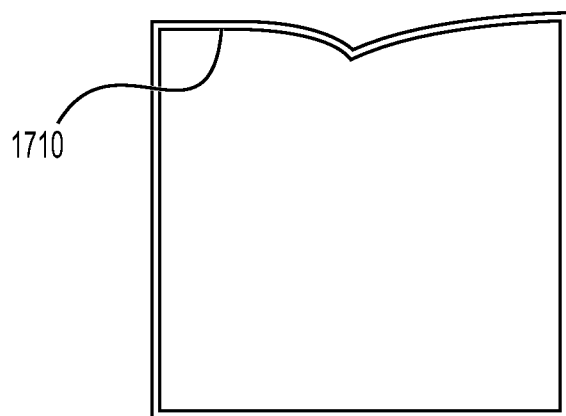

Additional overlapping structure layers may be generated by offsetting points from propagation surface 60 or base layer 68, or by offsetting from any previous structure layer of structure 12 in propagation direction 70. Offsetting layers may result in self-intersection in the offset layer (e.g., when the base layer includes concave features). This self-intersection may be corrected, as shown in FIGS. 17-19. Referring to FIG. 17, a layer of structure 12 is to be determined by offsetting a surface 1700 in a direction normal to that surface. The direction normal to surface 1700 is shown by arrows 1702. FIG. 18 shows the resulting surface 1704. Because surface 1700 includes a concave feature, when it is offset then one side 1700a of the concave feature crosses an opposite side 1700b of the concave feature. This results in self-intersection of resulting surface 1704, which can be seen to self-intersect at point 1706 and the looped part 1708 of surface 1704 that is below the self-intersection point 1706. The self-intersection, when seen across an entire surface, will, in most cases, be a seam across that surface. The self-intersection is identified by computing device 16 and the part 1708 of surface 1704 that is below self-intersection point 1706 is removed. The final offset surface 1710 is shown in FIG. 19. Surface 1710 is parameterized and used to generate tool paths.

Computing device 16 may determine a plurality of additional structure layers 72 (Step 2410). Structure layers 72 may each be offset from propagation surface 60 or from a previous layer. For example, a first structure layer 72A may be offset from base layer 68 and a second structure layer 72B may be offset from first structure layer 72A. Each structure layer 72 may be offset from the previous layer by an amount equal to a desired thickness of the structure layer 72 (e.g., a thickness of material to be deposited within the layer). It will be appreciated that one or more structure layers 72 may have substantially the same thickness. It will also be understood that thickness may vary between structure layers 72. Computing device 16 may be configured to discretize the data identifying propagation surface 60 and/or any previous layer into a plurality of points, and to offset each point in propagation direction 70. Alternatively, the data identifying propagation surface 60 may be discretized when it is received.

Structure layers 72 may be determined until propagation boundary (e.g., surface 62B) is reached. After the propagation boundary is reached, no more structure layers 72 are determined. In specific arrangements, structure layers 72 may be determined until a part of the boundary furthest from the propagation surface 60 in the propagation direction 70 is reached. Put another way, structure layers 72 may be determined until the volume defined by boundary 62 is filled.

One or more structure layers 72 may be truncated or cut away. For example, referring to structure layers 72, they are offset from the previous layer until the penultimate structure layer 72C, which is the first structure layer to reach the surface 62B. A part of penultimate structure layer 72C is truncated so as to conform to surface 62B. However, the volume defined by boundary 62 is not yet filled. Therefore, a final structure layer 72D is offset from the penultimate structure layer 72C. Final structure layer 72D is truncated to conform to surface 62B and fills the volume defined by boundary 62. Therefore, no additional structure layers 72 are determined.

In arrangements where individual points of a new layer are offset from propagation surface 60 or a previous layer to form each new layer, each new layer may have a contour that is similar (e.g., nearly identical) to propagation surface 60 or the previous layer and contained within the boundary 62 defined by the mesh (e.g., within the side walls of the mesh) at the height of each layer. It will be appreciated that any promontory or concave feature of propagation surface 60 or a previous layer will be scaled according to the size of the offset. Further, any depression or concave feature of propagation surface 60 or a previous layer will be shallowed according to the size of the offset, eventually being smoothed out over a number of layers. It should be noted that although boundary 62 is of uniform lateral dimensions at any point along the propagation direction 70, in other arrangements the lateral dimensions of a boundary may shrink or grow as structure 12 progresses along the propagation direction 70, causing a corresponding area of each structure layer 72 to shrink or grow proportionally.

As with base layer 68, further tool paths are generated (Step 2412) for each structure layer 72. The further tool paths may be generated using any method described herein, in whole or in part, or using any method known in the art.

In exemplary arrangements, propagation surface 60 or any previous layer may be discretized by mapping the 3-dimensional surface 60 or layer into a 2-dimensional space having defined points. The points lying within the boundary of the two-dimensional propagation surface 60 or previous layer may then be mapped back into the 3-dimensional space. The 2-dimensional space may be associated with a default planar surface or, as will be explained in more detail below with regard to FIGS. 20-23, the 2-dimensional space may be customized by the user.

The tool paths may be generated utilizing the points discussed above. For example, after base layer 68 or structure layer 72 has been mapped to 2-dimensions, a 2-dimensional tool path may be generated within the 2-dimensional mapping space by sequencing the points. The 2-dimensional tool path may then be mapped onto the 3-dimensional structure layer 68, 72 using a suitable surface parameterization technique (e.g., UV parameterization, as discussed above), while maintaining the sequence of the points. In other words, each structure layer 68, 72 of structure 12 may be mapped into the 2-dimensional space, the points truncated based on the boundary as it relates to the layer, a base tool path or further tool path generated within that space using any method described herein or an alternative method known in the art, and then mapped back to the 3-dimensional space of the corresponding layer. The user may have the ability to upload an existing tool path, sketch a tool path, pick from any number of predefined tool paths, orient the tool paths, add/remove points from a tool path, smooth a tool path 51, and/or make other similar adjustments.

As shown in FIGS. 14 and 15, multiple different boundaries (e.g., boundaries 64, 66) may be used to define layers within structure 12. For example, boundaries 62, 64, 66 placed at different locations and/or orientations relative to each other. As shown in FIG. 14, surface 62B may be defined as an additional propagation surface, and a second boundary 64 may be projected toward surface 62B to define a second enclosed volume in which material should be deposited. A second set of structure layers, beginning with a second base layer 74 and then further structure layers, may be determined that are offset from surface 62B and contained within sidewalls of second boundary 64, in a similar way to that described above, and a second set of tool paths generated. It should be noted that, instead of being positioned on top of a final layer in a stack of layers propagated from surface 60 within boundary 62, the second boundary 64 could alternatively or additionally be located adjacent a side of the stack of structure layers 72 (i.e., without regard to gravity), if desired.

It should be noted that propagation of the layers within structure 12 may not be limited to a single direction. For example, had the second boundary 64 been stacked adjacent a side of the structure layers 72, the new propagation direction could have been orthogonal to propagation direction 70.

In another example, and as also shown in FIGS. 14 and 15, the second boundary 64 may be nested within a third boundary 66. In this example, a third propagation surface may be defined to include part of surface 62B and additional surface(s) formed from the second set of further layers within boundary 64. As discussed above, the propagation direction may be any direction normal to the propagation surface at each point within the propagation surface. Accordingly, during propagation of a third set of layers from the third propagation surface, propagation may be in multiple directions at the same time (e.g., in the direction normal to surface 64B and in an orthogonal direction—see FIG. 15). This propagation may continue in all directions until boundary 66 is reached and the volume formed by boundary 66 is filled.

When one or more boundaries (e.g., boundary 64) are nested within another boundary 66, a user may be able to define which boundary functions as the propagation surface and which boundary limits the propagation extent. For example, the second boundary 64 may be used alone to generate base layer 74 and to facilitate propagation of the structure layers in the given direction up to the limit of the corresponding boundary, and thereafter the third boundary 66 may be utilized for further propagation of additional layers around the second boundary 64. This is illustrated in FIG. 15. However, the user could instead choose to allow the third boundary 66 to define a contour of second base layer 74, with the second boundary 64 functioning only to truncate an area of that contour (i.e., to limit propagation of the layers outward to a volume confined by the side walls and ceiling of boundary 64—see FIG. 16).

Similarly, the user may be able to define an order in which boundary 62 is to be used for propagation. For example, the user may be able to propagate layers within the third boundary 66 first (e.g., within a space defined outside of boundary 64) using the contour of intersection between boundary 66 and the original boundary 62, and thereafter to propagate layers within the second boundary 64 using the contours of intersection between boundary 64 and both of the original boundary 62 and the third boundary 66. As illustrated in FIG. 16, the order in which the boundaries are utilized for propagation may affect a size, shape, and contour of the resulting layers.

Figure 20:
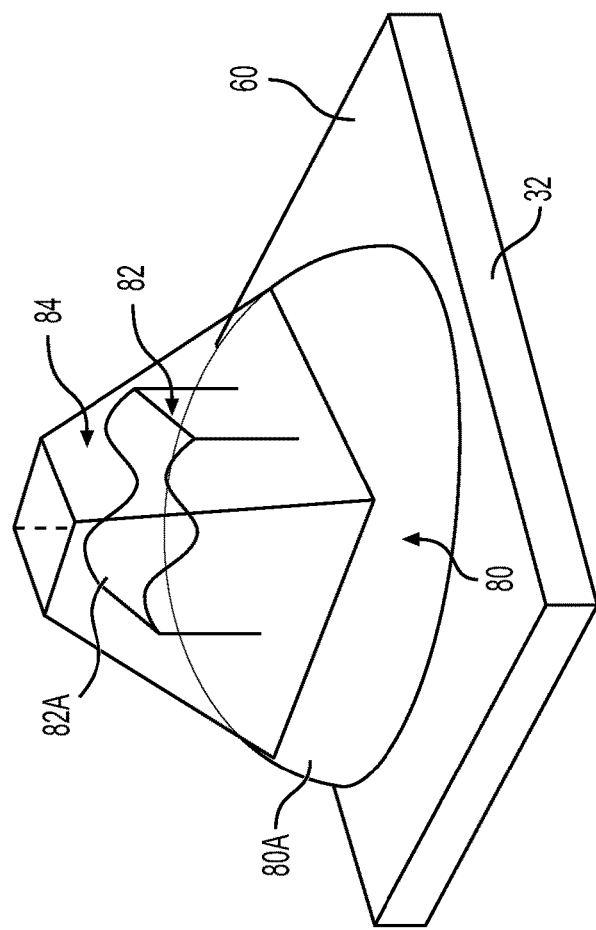
Figure 24:
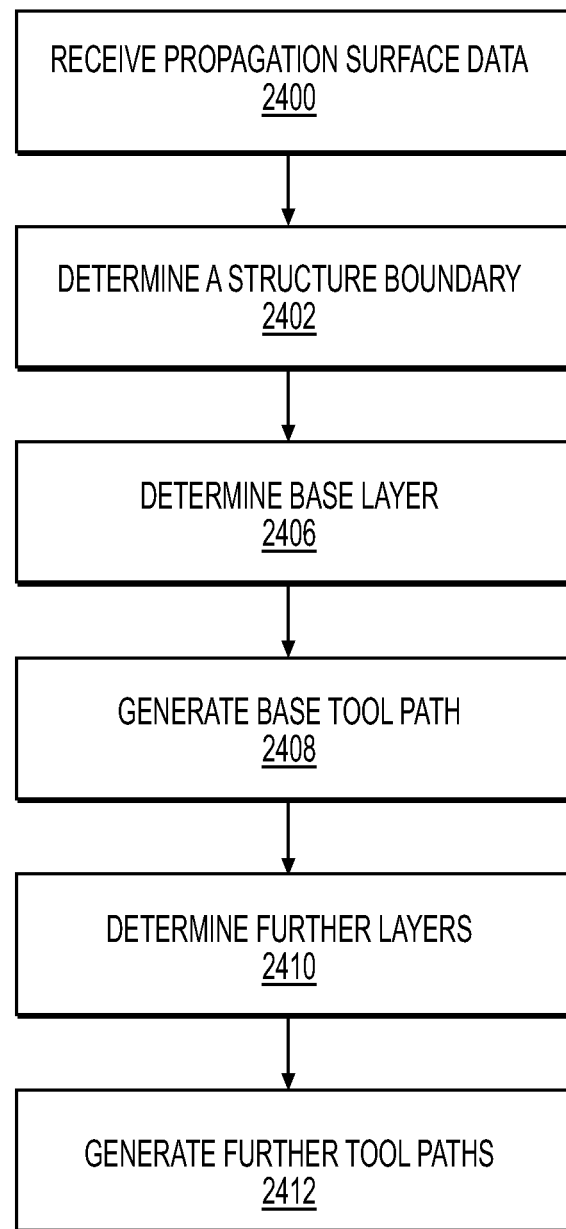
FIG. 24 is a flowchart representing an exemplary method that may be implemented by the control system of FIGS. 1 and 2.

In another example illustrated in FIGS. 20-23, the user may be able to define one or more parameterization boundaries to be used in the mapping of points and tool paths 51 discussed above. That is, instead of always using a default parameterization boundary (e.g., the predefined points associated with build platform 32), the user may be able to define a different and/or custom surface to function as the parameterization boundary. FIG. 20 shows build platform 32 with a first boundary 80 projected towards and, in this case intersecting surface 60 of build platform 32. A second boundary 82 is projected towards a surface 80A of first boundary 80. In the exemplary arrangement of FIG. 20, surface 80A is a partial ellipsoid. A parameterization boundary 84 is positioned to encompass second boundary 82 and is projected toward surface 80A.

Figure 21:
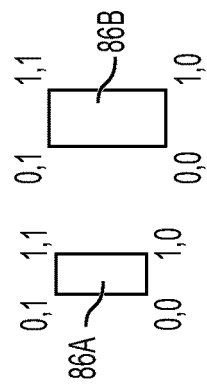
FIGS. 20-23 are schematic illustrations showing a parameterization boundary used during propagation of layers of a structure to be fabricated by the machine of FIG. 1.

As shown in the example of FIG. 21, using the method described above in relation to FIGS. 14-19, layers of structure 12 are propagated through second boundary 82 by offsetting from surface 80A. An upper surface 82A of second boundary 82 has varying height and, in the example of FIG. 20, is wavey. Therefore, after generating layers of structure 12 based on an intersection of a layer offset from surface 80A with second boundary 82, two separate three-dimensional regions 86A, 86B of the layer may be generated.

Each of regions 86A, 86B may be mapped from 3-dimensions to 2-dimensional space (i.e., to correspond to build platform 32) using a surface parameterization technique, such as UV parameterization. This process may be done before tool paths 51 are generated. Separately mapping each region 86A, 86B to 2-dimensions may result in each region being parameterized differently and having its own coordinate system, as shown in FIG. 21. Due to potential errors in the parameterization technique, regions 86A, 86B may become misaligned and/or a spatial relationship between them may change. This may result in tool paths 51 generated for regions 86A, 86B being unrelated to underlying tool paths 51 (e.g., where only a single region was generated) and therefore misaligned and/or wrongly positioned.

Figure 22:
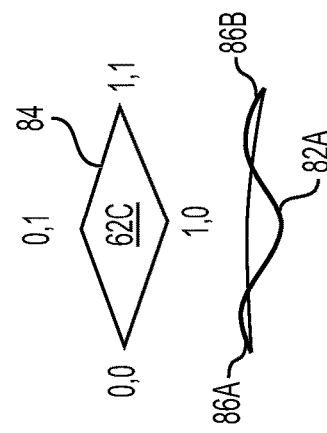
Figure 23:
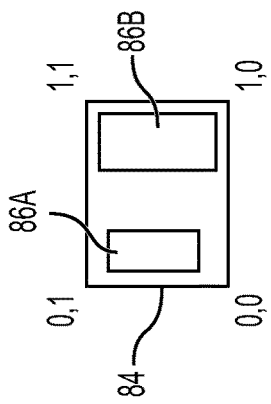

As shown in FIGS. 20, 22 and 23, parameterization boundary 84 may be defined to function as a mapping/parameterization space for the layers created within second boundary 82 (e.g., by intersecting second boundary 82 with layers offset from surface 80A of first boundary 80 and truncated outlying points). As shown in FIG. 23, a parameterization layer is taken to be the intersection of the offset layer with parameterization boundary 84. The parameterization layer includes regions 86A, 86B. The entire parameterization layer may be parameterized together using parameterization boundary 84 to provide the coordinate system. By configuring the parameterization technique to preserve the spatial relationship between features of the layer, the spatial relationship between regions 86A and 86B is maintained. In this manner, the separate regions 86A, 86B may be commonly parameterized within the same space and thereafter truncated based on boundaries of the regions 86A, 86B at each layer, allowing correlation between the subsequently generated tool paths 51 of each region 86A, 86B.

In exemplary arrangements, a plurality of parameterization layers may provide a common coordinate system for multiple layers of structure 12. Referring to FIG. 15, base layer 68 and a plurality of further layers 72 may be identical. Accordingly, the tool paths 51 for these layers may be generated more efficiently by re-using the tool path of the previous layer (e.g., via the organizational tree of FIG. 12). This removes the computational burden of mapping each layer to 2-dimensional space and generating the tool path. The parameterization boundary may be determined such that it provides a plurality of parameterization layers having the same area when the propagation surface is offset. The parameterization layers may therefore provide a consistent coordinate system for identical layers of structure 12. Each identical layer may be positioned at the same location within the consistent coordinate system of the parameterization layer. It is noted that this method may also be used when structure layers are similar, as defined below with respect to FIGS. 28-30. That is, the method may be used where structure layers are not identical but have a correlation coefficient greater than a correlation threshold value.

Figure 25A:
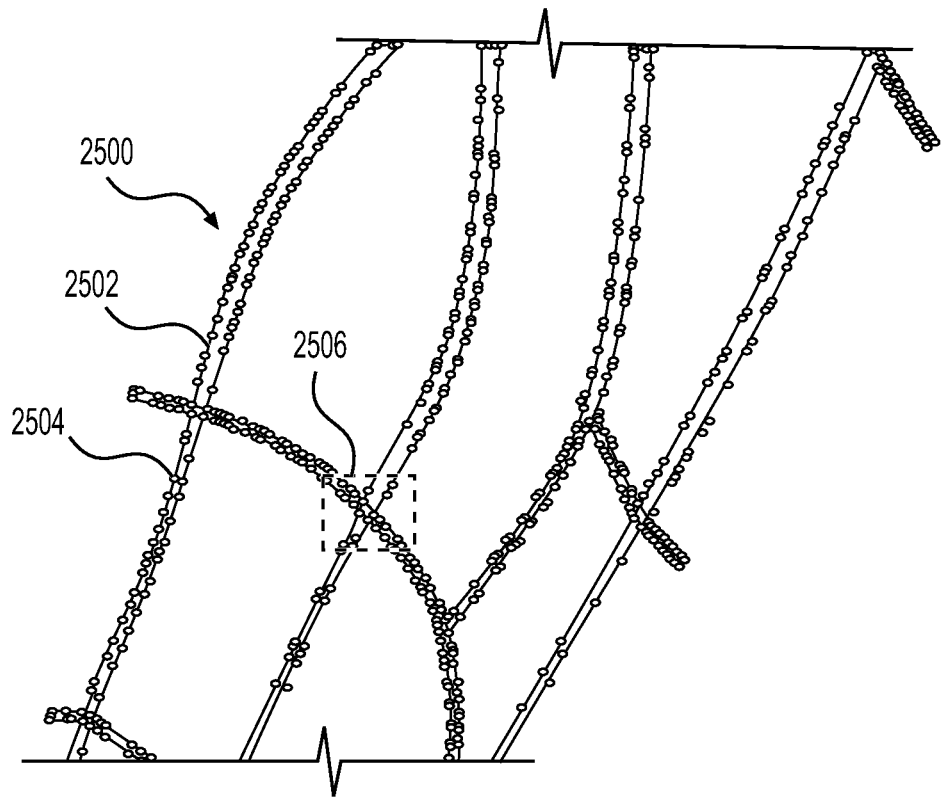
FIGS. 25a-f are schematic illustrations of a virtual model of a layer of a structure at various stages of the method shown in FIG. 26.
Figure 25B:
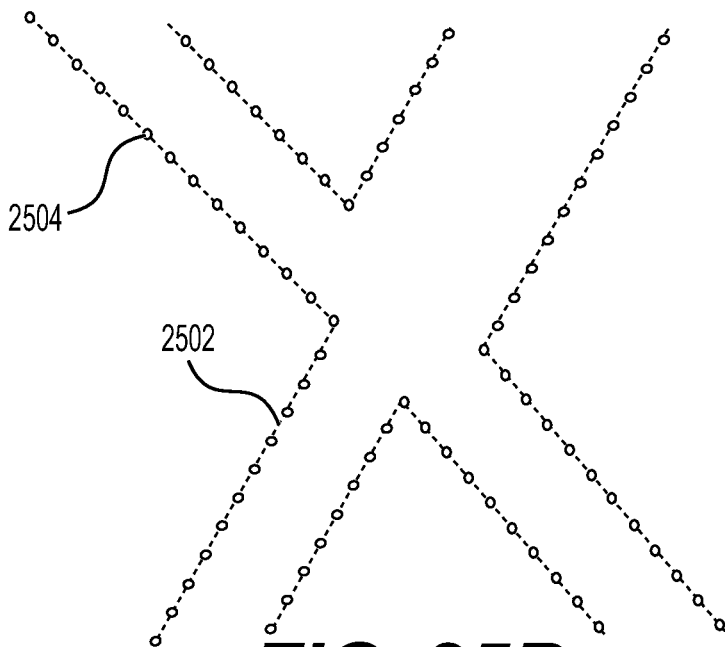
Figure 25C:
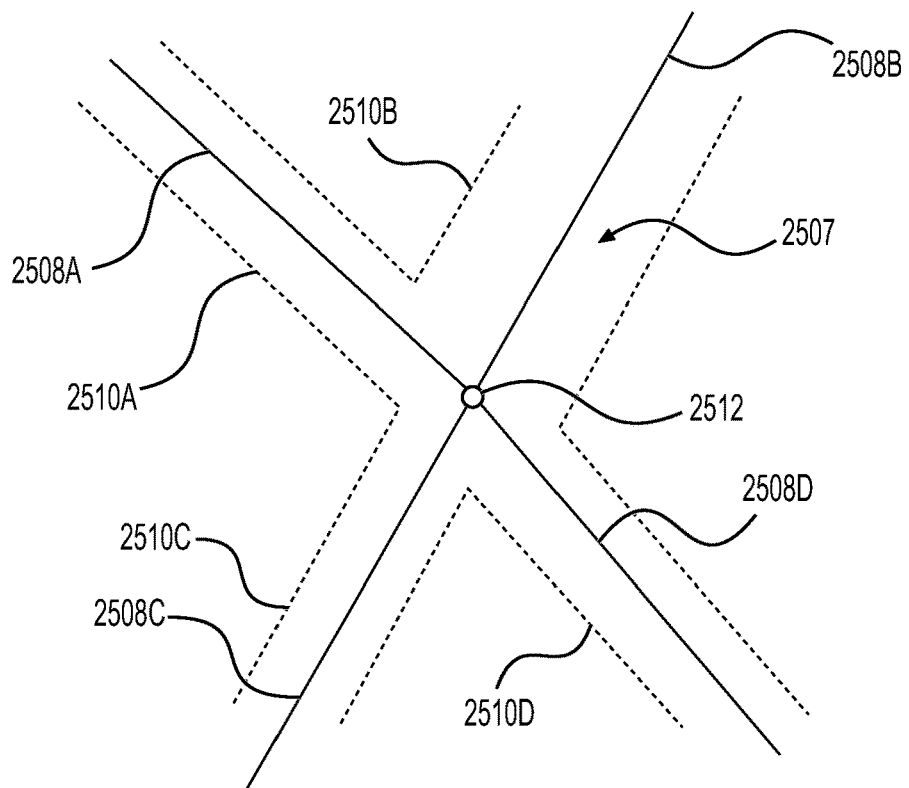
Figure 25D:
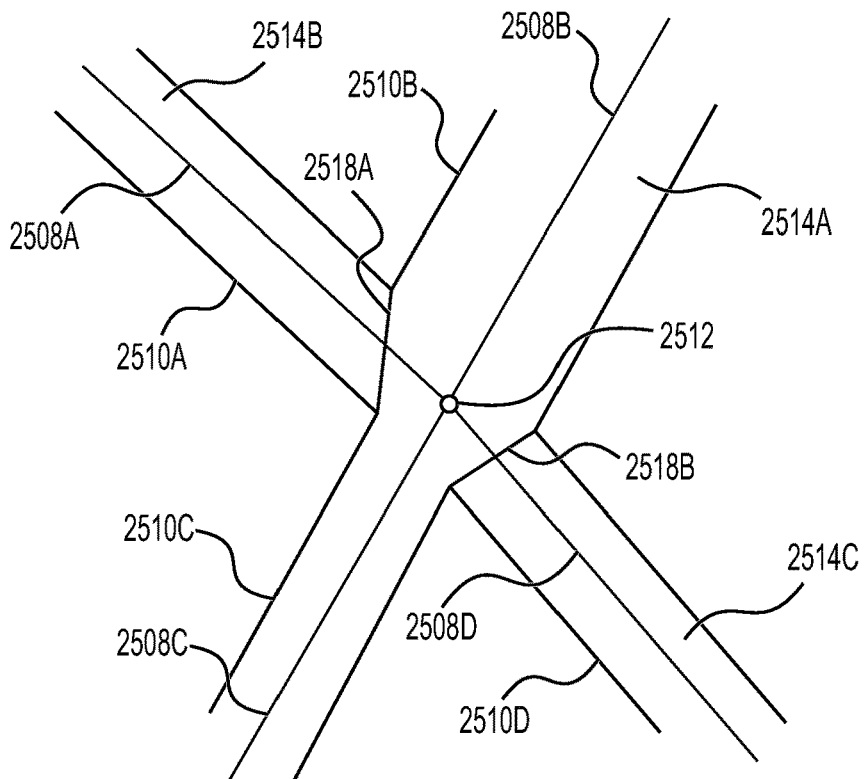
Figure 25E:
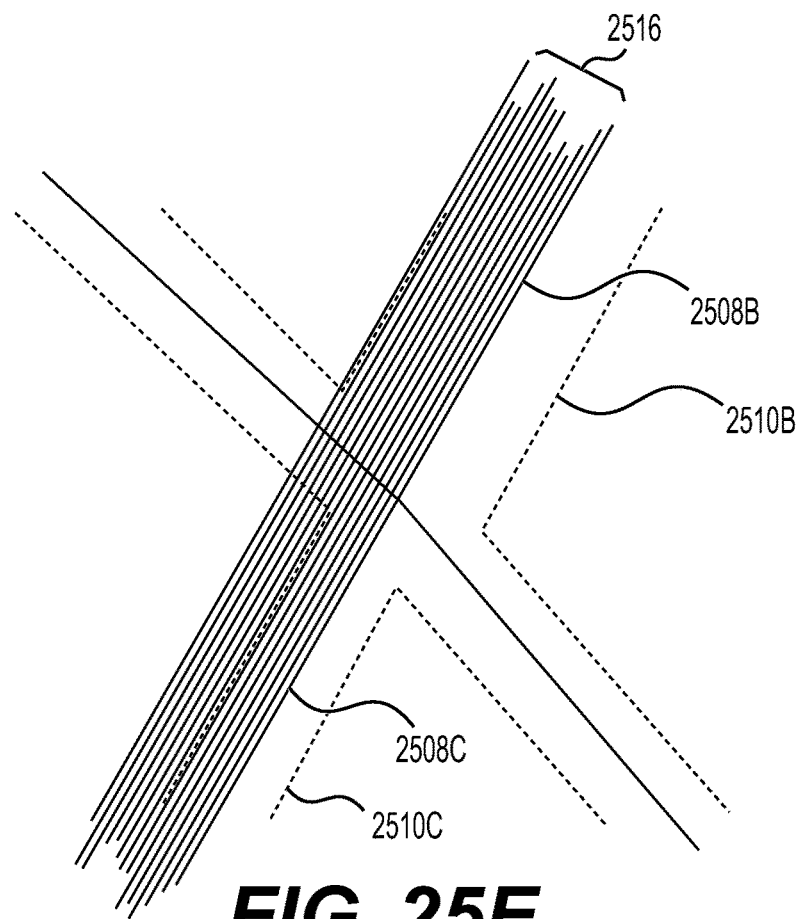
Figure 25F:
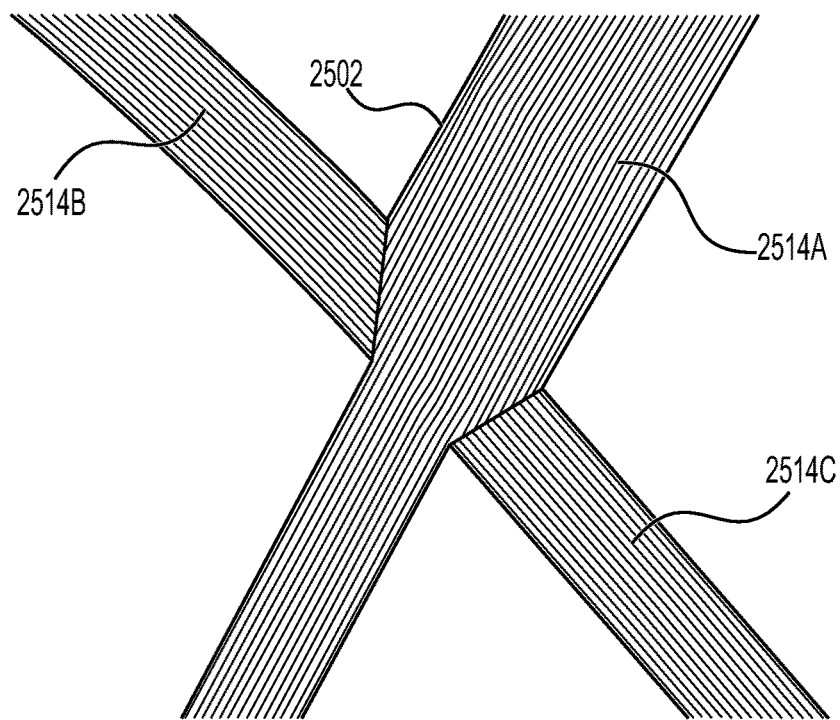
Figure 26:
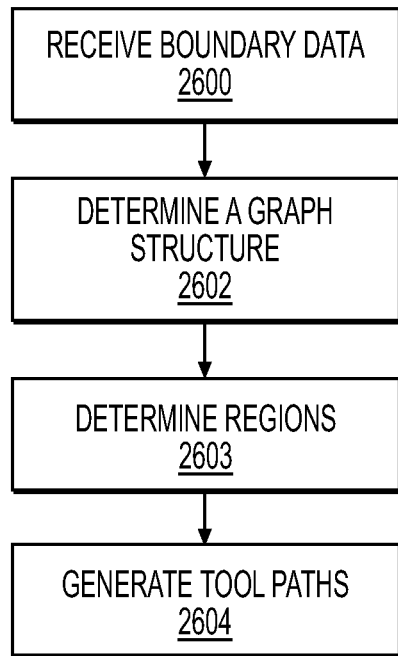
FIG. 26 is flowchart representing an exemplary method of determining a tool path for use by the machine of FIG. 1 during additive manufacturing a structure.

FIG. 26 shows a flow diagram for a method of determining a tool path 51. FIGS. 25a-f show schematic representations of a virtual model of structure 12 at different points through the method of FIG. 26.

Boundary data 2500 is received by computing device 16 (Step 2600) and may include polygonal boundary data and/or spline boundary data. Boundary data 2500 defines, at least partially, an outer boundary 2502 of a layer of structure 12. In the exemplary arrangement shown in FIGS. 25a-f, boundary data 2500 is polygonal and includes a plurality of points 2504 that may be connected to define outer boundary 2502. For clarity, FIGS. 25b-f show an enlarged section 2506 of the virtual model of structure 12 shown in FIG. 25a.

Based on boundary data 2500, a graph structure is determined (Step 2602). In the exemplary arrangement of FIG. 25c, a graph structure 2507 includes a plurality of edges 2508a-d and a node 2512. The edges 2508a-d represent elongate elements 2510a-d of structure 12 and, in the exemplary arrangement of FIG. 25c, are located within outer boundary 2502. Each edge 2508a-d may be an axis of one or more elongate elements 2510a-d of structure 12 and specifically, each edge 2508a-d is a medial axis of an elongate member 2510a-d. It will be appreciated that an edge 2508a-d may be located inside or outside outer boundary 2502 and/or may be coincident with one or more elements of outer boundary 2502.

Outer boundary 2502 includes a plurality of elongate elements 2510a-d and, in such arrangements, graph structure 2507 may be determined to include an edge 2508a-d for each elongate element 2510a-d that is a medial axis of each elongate element 2510a-d, and a node 2512 at each intersection of edges 2508a-d. Nodes may also be located at the end of an edge. Graph structure 2507 may be used to determine a plurality of regions of outer boundary 2502 that may be used during pathing. The plurality of regions may be determined by a user. In other arrangements, the plurality of regions may be determined by computing device 16 based on one or more predetermined criteria.

For example, the plurality of regions may be determined such that a branch angle (i.e., an angle between elongate elements 2510a-d forming a region) is not less than a threshold branch angle (i.e., that the branch angle is not too tight). Alternatively or in addition, the plurality of regions may be determined such that any one region does not exceed a length threshold. In exemplary arrangements, a region does not cross itself. A region includes one or more elongate elements, as defined by graph structure 2507 and outer boundary 2502. That is, a plurality of regions may be determined by identifying one or more edges 2508a-d of graph structure 2507 based on a walking strategy, and outer boundary 2502 of the associated elongate elements 2510a-d.

In exemplary arrangements a relationship between edges 2508a-d and outer boundary 2502 of the associated elongate elements 2510a-d is known such that regional boundaries may be formed from edges 2508a-d.

FIG. 25d shows three regions 2514a-c. A first region 2514a includes elongate elements 2510b and 2510c, a second region 2514b includes elongate element 2510a and a third region 2514c includes elongate element 2510d. Using the method described above, regions of a layer of structure 12 may be determined easily and in a way that allows them to be pathed separately.

Once regions 2514a-c have been determined, tool paths 51 may be generated for each region 2514a-c (Step 2604). Tool paths 51 may be generated using any process disclosed herein.

As seen in FIG. 25e, computing device 16 may, for example, generate a plurality of adjacent tool paths that are each offset from an edge 2508a-d of graph structure 2507. This is shown in the case of first region 2514a formed by elongate elements 2510b, 2510c. FIG. 25e shows adjacent tool paths 2516 offset from edges 2508b, 2508c of first region 2514a in a direction normal to edges 2508b, 2508c. Although not shown in the drawings, it is noted that edges 2508a-d may be curved or straight. Adjacent tool paths 2516 may be offset by a distance equivalent to a thickness of a material to be deposited by machine 14 when fabricating structure 12. Although not shown in FIG. 25e, further adjacent paths may be offset in an opposite direction from edges 2508b, 2508c. In addition, adjacent paths may be generated that are offset from the remaining edges 2508a, 2508d. This is discussed in greater detail below. It is also noted that adjacent tool paths 2516 may be offset from outer boundary 2502 or another reference.

Adjacent tool paths 2516 are generated that cover an area extending beyond outer boundary 2502, as can be seen in FIG. 25e. Boundary data 2500 may be superimposed on adjacent paths 2516, which may then be adapted, for example by clipping or diverting one or more adjacent paths 2516, so that they are contained within outer boundary 2502. In exemplary arrangements, adjacent paths for each region 2514a-c may be generated separately. Accordingly, regional boundary data defining a boundary of each region 2514a-c may be superimposed on adjacent tool paths 2516, which may be adapted to be contained within the regional boundary data. For example, adjacent tool paths 2516 may be clipped to be contained within regional boundary lines 2518a-b as they taper from a relatively wider elongate element 2510b to a relatively narrower elongate element 2510c. Adjacent tool paths for other regions 2514b, 2415c may be generated and/or adapted such that they do not overlap with adjacent paths 2516 of first region 2514a. In exemplary arrangements, tool paths for second and third regions 2514b, 2514c may be generated separately, or as single tool paths that are then clipped by superimposing regional boundary data onto them. FIG. 25f shows adapted tool paths within outer boundary 2502. As can be seen in FIG. 25f, the adjacent paths of second and third regions 2514b, 2514c may be terminated before they intersect with any of adjacent tool paths 2516 of first region 2514a.

Structure 12 may be formed of a plurality of overlapping layers of material, and boundary data 2500 may relate to at least part of a first layer that, when fabricated, will be overlapped by a second layer. In such arrangements, the regions 2514a-c in the first layer may be defined such that they are not aligned with the regions in the second layer. For example, if regions 2514a-c are defined in the second layer, then in the first layer a first region may include elongate elements 2510*a* and 2510*d*, a second region may include elongate element 2510*b*, and a third region may include elongate element 2510*c*. In this way, the boundaries of regions within overlapping layers may be misaligned to improve a property (e.g., a strength) of structure 12. Further, adjacent tool paths of the first layer may be offset from adjacent tool paths of the second layer.

In the exemplary arrangement shown in FIG. 25*f*, adjacent tool paths within the same layer are offset from each other by the width of material to be deposited by machine 14 during fabrication. However, in other arrangements adjacent tool paths may be offset by a greater amount. In yet further arrangements part of the adjacent tool paths may be offset from each other by the width of material to be deposited and part of the adjacent tool paths may be offset by a greater amount.

Outer boundary 2502 may form part of a non-planar layer of structure 12. The non-planar layer may be mapped or transformed into 2-dimensions before the plurality of adjacent tool paths are generated. After the adjacent tool paths have been adapted, the adjacent tool paths may be mapped back from 2-dimensions to conform to the non-planar layer. The mapping may be done using a surface parameterization technique, such as UV parameterization or any other known technique.

In arrangements discussed above, adjacent tool paths are spatially offset from edges 2508*a-d* of graph structure 2507 and other adjacent tool paths. It is envisaged that adjacent tool paths may be rotationally and/or spatially offset from edges 2508*a-d* of graph structure 2507, for example in a way similar to the spokes of a wheel. Further, edges 2508*a-d* of graph structure 2507 may be curved or linear and, for curved edges, the offset may be in a direction normal to any point on the edge.

Figure 27:
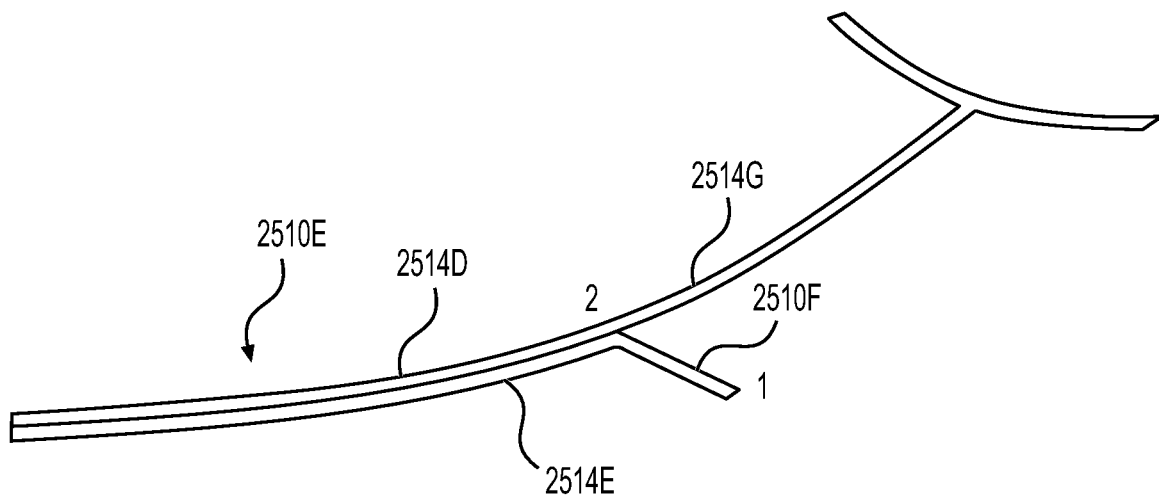
FIG. 27 is a schematic representation of regions of a layer of a structure to be fabricated by the machine of FIG. 1.

Referring to FIG. 27, two or more regions 2514*d-e* may form at least part of an elongate element 2510*e*. In the example of FIG. 27, part of regions 2514*d* and 2514*e* run parallel with each other within elongate element 2510*e*. Regions 2514*d-e* may form at least part of a plurality of elongate elements. For example, region 2514*e* may extend or be diverted into a transverse elongate element 2510*f* and/or region 2514*d* may extend into an elongate element 2510*g* continuing in the same direction from elongate element 2510*e*. Regions 2514*d-e* may combine with further regions to form further elongate elements. Regions 2514*d-e* may also recombine to form a further elongate element.

In exemplary arrangements, after graph structure 2507 has been formed and the plurality of regions 2514*a-c* defined, tool paths 51 may be generated using alternative methods. Tool paths 51 may be generated using any method described herein or any method known in the art. For example, tool paths 51 of regions 2514*a-c* may be determined using partitioning lines, as in the method described in relation to FIGS. 3-10. After such methods an outer wall of regions 2514*a-c* may be formed and infill may be provided to the regions 2514*a-c* by offsetting a plurality of adjacent layers from edges 2508*a-d* of graph structure 2507. It is also noted that tool paths 51 may be generated for any region (e.g., without the need to first generate graph structure 2507) using the method described in relation to FIGS. 3-10 combined with infill provided by offsetting a plurality of adjacent layers from a reference for the region. The reference may, for example, be a medial axis of the region, an outer boundary of the region or any other reference.

The layer of structure 12 defined by boundary data 2500 may be a first layer onto which a second, overlapping layer is to be deposited. In exemplary arrangements, graph structure 2507 of the first layer may be compared to a graph structure of the second layer to determine a correlation between the two graph structures. Based on the correlation (i.e., if the correlation is above a threshold value), then the walking strategy used to determine regions 2514*a-c* of the first layer may also be used, at least in part, to determine regions of the second layer. This may be advantageous in cases where a coefficient of the correlation is above a threshold value but less than 1, for example where the correlation is high but the graph structures are not identical.

Figure 28:
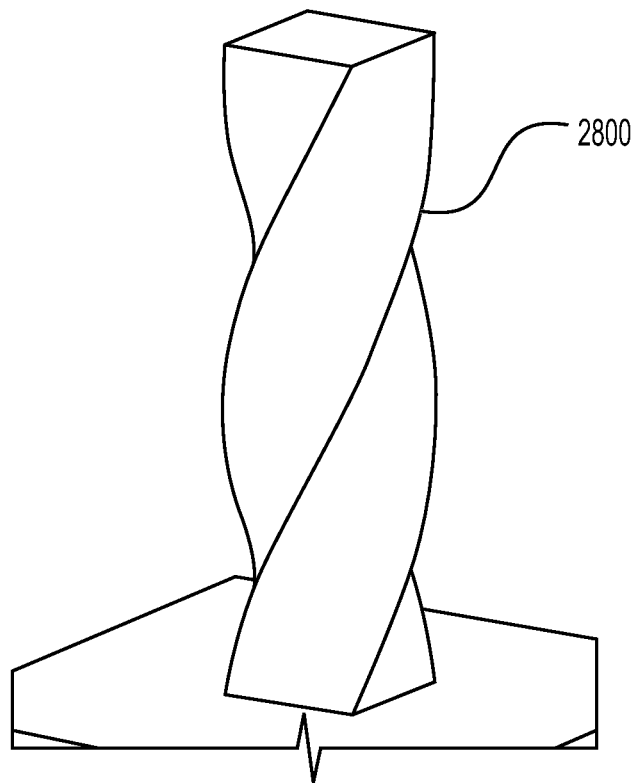
FIG. 28 is a schematic illustration of an exemplary structure to be fabricated by the machine of FIG. 1.
Figure 29:
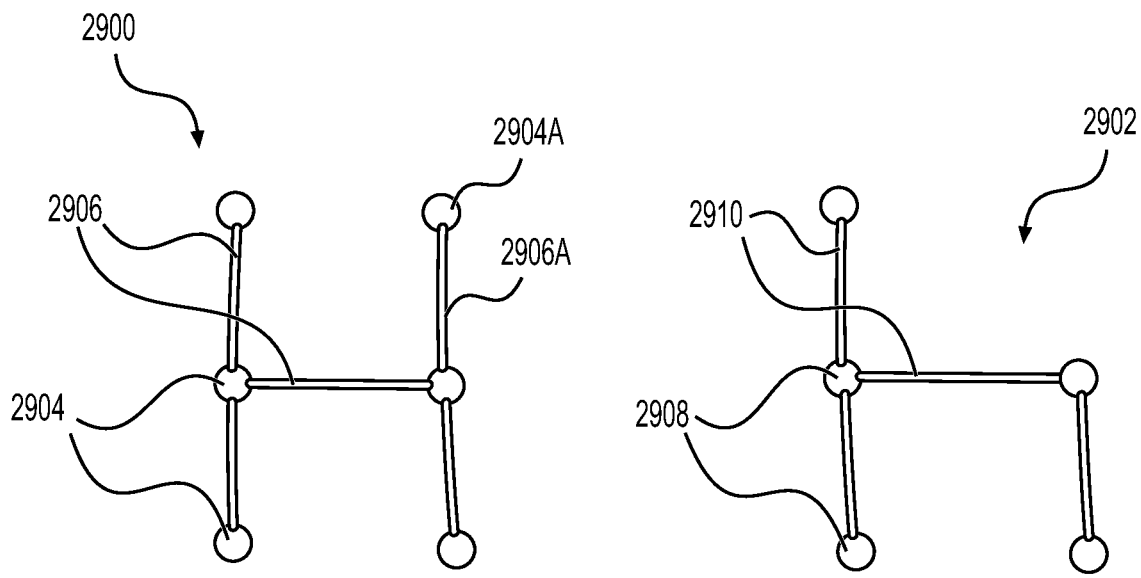
FIG. 29 is a schematic illustration of exemplary graph structures of a layer of a structure to be fabricated by the machine of FIG. 1.

Referring to FIGS. 28 and 29, examples are given of layers of structure 12 having similar but non-identical graph structures. FIG. 28 shows a twisted structure 2800 comprised of a plurality of layers. Each layer is rotated with respect to the previous layer to produce twisted structure 2800. As a result of the rotation, subsequent layers of twisted structure 2800 are not identical, even though they include the same geometric structure. FIG. 29 shows a graph structure 2900 of a first layer and a graph structure 2902 of a second layer. Graph structure 2900 includes a plurality of first nodes 2904 and first edges 2906. In particular, graph structure 2900 includes first node 2904*a* and first edge 2906*a*. Graph structure 2902 includes a plurality of second nodes 2908 and second edges 2910. The second nodes 2908 and second edges 2910 are geometrically the same (the edges have the same size and orientation, and the nodes have the same position) as the first nodes 2904 and second nodes 2906, except that there is no second node corresponding to first node 2904*a* and no second edge corresponding to first edge 2906*a*. Despite this, the walking strategy for graph structure 2900 may be used for graph structure 2902, as it relates to the corresponding nodes and edges.

Figure 30:
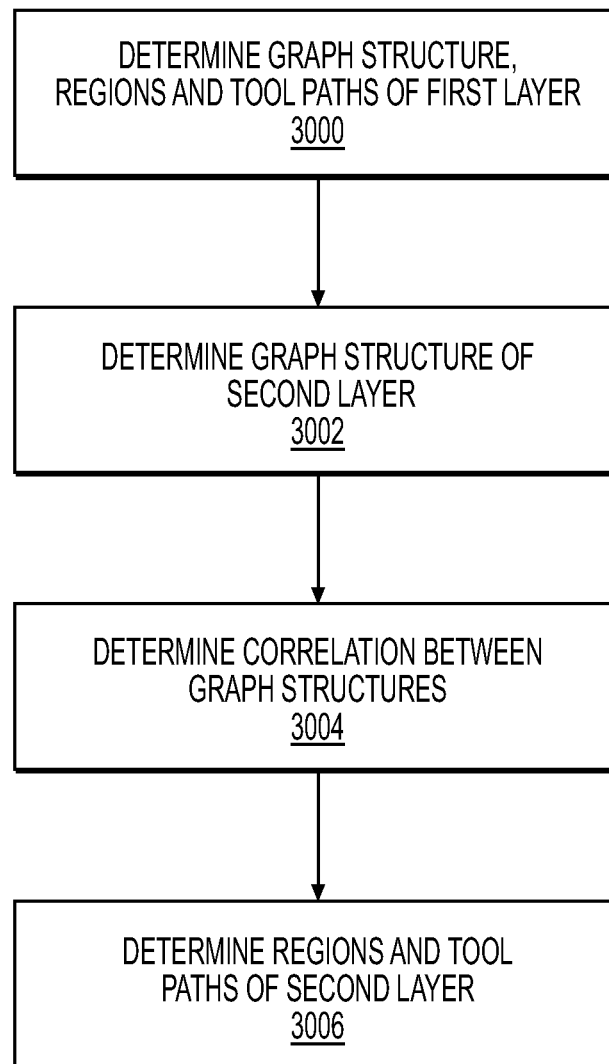
FIG. 30 is a flowchart representing an exemplary method that may be implemented by the control system of FIGS. 1 and 2.

FIG. 30 is a flowchart showing a method of determining a tool path of a second layer overlapping a first layer. In a manner discussed above, first graph structure 2900 is determined based on boundary data 2500 and a plurality of regions and the tool paths are determined for the first layer (Step 3000). Second boundary data is received that at least partially defines an outer boundary of a second layer of structure 12 that will overlap the first layer. Based on the second boundary data, second graph structure 2902 for the second layer is determined (Step 3002). This may be done using a similar method to that discussed above in respect of the first layer.

First and second graph structures 2900, 2902 may be compared to determine a correlation between them (Step 3004). Determining the correlation may include determining a geometric similarity between first and second graph structures 2900, 2902. Geometric similarity need not be based on a position and/or orientation of the second layer with respect to the first layer when deposited by machine 14. Further, geometric similarity need not be based on an overall scale of the second layer with respect to the first layer (i.e., consecutive layers may be scaled versions of each other). Instead, geometric similarity may relate to the relative positions between first and second nodes 2904, 2908 and edges 2906, 2910 within each graph structure 2900, 2902. That is, correlation and geometric similarity may be based on the size and shape of each graph structure 2900, 2902 and not on the position and/or orientation of each layer within structure 12.

One or more first nodes 2904 may be determined to be correlated with corresponding second nodes 2908 if they are geometrically positioned within a distance threshold of the corresponding second nodes 2908. One or more first edges 2906 may be determined to be correlated with corresponding second edges 2910 if they have an angle within an angle threshold and/or a length within a length threshold of the corresponding second edges 2908. Correlation may be concluded based on a node-by-node or edge-by-edge comparison or based on a comparison of plurality of first nodes and/or edges to a plurality of a second nodes and/or edges. A correlation coefficient may be assigned to each comparison. If the correlation coefficient is greater than a coefficient threshold (or the graph structure 2900, 2902 are otherwise determined to be correlated) then the regions of the second layer may be determined based on the walking strategy used in determining the regions of the first layer. Optionally, tool paths of the second layer may be determined based on the tool paths of the first layer. In exemplary arrangements, the correlation coefficient may be less than 1 for graph structures 2900, 2902, because they are not identical.

In exemplary arrangements, a weighting may be applied to one or more of first and/or second nodes 2904, 2908 and/or to first and/or second edges 2906, 2910. The weighting may signify an importance that a first node 2904 or first edge 2906 is correlated with a corresponding second node 2908 or second edge 2910. The weighting may be used in determining the overall correlation.

It will be apparent to those skilled in the art that various modifications and variations can be made to the disclosed systems and methods. Other embodiments will be apparent to those skilled in the art from consideration of the specification and practice of the disclosed systems and methods. It is intended that the specification and examples be considered as exemplary only, with a true scope being indicated by the following claims and their equivalents.

What is claimed is:

1. A method of determining a tool path for use in additively manufacturing a structure, the method comprising:
    receiving a model of the structure having a base surface that will rest on a build plate during manufacturing and at least one other surface;
    identifying the at least one other surface as a propagation surface;
 determining a structure boundary associated with the propagation surface and defining at least part of the structure;
    determining one or more structure layers offset from and based on the propagation surface and laterally bounded by the structure boundary;
    generating a tool path for each structure layer; and
    controlling an additive manufacturing tool to manufacture the structure based on the generated tool path.

2. The method of claim 1, wherein the structure boundary is a 3-dimensional boundary.

3. The method of claim 1, wherein:
the one or more structure layers are 3-dimensional; and
the method further includes:
    before generating the tool path, mapping the one or more structure layers to 2-dimensions; and
    after generating the tool path, mapping the tool path to 3-dimensions.

4. The method of claim 3, wherein mapping of the one or more structure layers and the tool path preserves a spatial relationship between features of a surface of the one or more structure layers.

5. The method of claim 3, including:
determining a parameterization boundary associated with the propagation surface and at least partially enclosing the structure boundary; and
determining one or more parameterization layers offset from the propagation surface and laterally bounded by the parameterization boundary,
wherein:
    each of the one or more parameterization layers includes a structure layer; and
    mapping the structure layer to 2-dimensions includes mapping the one or more parameterization layers to 2-dimensions.

6. The method of claim 1, wherein:
the one or more structure layers include a plurality of structure layers; and
the method further includes:
    determining a parameterization boundary associated with the propagation surface and at least partially enclosing the structure boundary;
    determining a parameterization layer for each structure layer, wherein each parameterization layer is offset from the propagation surface, laterally bounded by the parameterization boundary and includes a structure layer, and wherein the parameterization boundary is arranged such that the parameterization layer for each structure layer has the same area;
    determining a first tool path for a first structure layer;
    recording a position of the determined tool path within its parameterization layer;
    determining a second tool path for each of any remaining structure layers that is based on the first tool path for the first structure layer; and
    positioning each second tool path at the recorded position within each corresponding parameterization layer.

7. The method of claim 6, wherein each structure layer is identical.

8. The method of claim 7, wherein the second tool path is a copy of the first tool path.

9. The method of claim 6, further including determining a correlation between the plurality of structure layers, and wherein the plurality of structure layers are similar if the correlation is above a correlation threshold value.

10. The method of claim 9, wherein the second tool path is an amended and/or scaled version of the first tool path.

11. The method of claim 6, wherein a propagation direction for offsetting the one or more structure layers is normal to the propagation surface.

12. The method of claim 11, wherein:
determining the one or more structure layers includes determining whether self-intersection has occurred as a result of the offset; and
the method further includes removing a part of the any layer that is closer to the propagation surface than an offset distance.

13. The method of claim 1, further including compiling and outputting machine code including instructions for controlling an additive manufacturing tool based on the generated tool path.

* * * * *